(12) United States Patent
Tsai et al.

(10) Patent No.: US 10,056,944 B2
(45) Date of Patent: Aug. 21, 2018

(54) DATA DETERMINATION METHOD FOR SUPPLYING-END MODULE OF INDUCTION TYPE POWER SUPPLY SYSTEM AND RELATED SUPPLYING-END MODULE

(71) Applicant: Fu Da Tong Technology Co., Ltd., New Taipei (TW)

(72) Inventors: Ming-Chiu Tsai, New Taipei (TW); Chi-Che Chan, New Taipei (TW)

(73) Assignee: Fu Da Tong Technology Co., Ltd., New Taipei (TW)

( * ) Notice: Subject to any disclaimer, the term of this patent is extended or adjusted under 35 U.S.C. 154(b) by 810 days.

(21) Appl. No.: 14/535,338

(22) Filed: Nov. 7, 2014

(65) Prior Publication Data

US 2015/0065045 A1    Mar. 5, 2015

Related U.S. Application Data

(63) Continuation-in-part of application No. 13/900,544, filed on May 23, 2013, now Pat. No. 9,600,021, and
(Continued)

(30) Foreign Application Priority Data

Feb. 1, 2011   (TW) .............................. 100103836 A
Mar. 14, 2012  (TW) .............................. 101108610 A
(Continued)

(51) Int. Cl.
*H01F 27/42*    (2006.01)
*H01F 37/00*    (2006.01)
(Continued)

(52) U.S. Cl.
CPC ............. *H04B 5/0037* (2013.01); *G06F 1/26* (2013.01); *H02J 50/10* (2016.02); *H02J 50/80* (2016.02);
(Continued)

(58) Field of Classification Search
CPC .. H04B 5/0037; H04B 5/0075; H04B 5/0031; G06F 1/12; G06F 1/324; H02J 50/80; H02J 50/10
See application file for complete search history.

(56) References Cited

U.S. PATENT DOCUMENTS 4,393,516 A    7/1983   Itani
4,561,443 A    12/1985  Hogrefe
(Continued)

FOREIGN PATENT DOCUMENTS

CN    1142649 A    2/1997
CN    1476535 A    2/2004
(Continued)

OTHER PUBLICATIONS

Yang, "A Multi-Coil Wireless Charging System with Parasitic Mental Detection", Donghua University Master Dissertation, China Master's Theses Full-text Database, Engineering Technology II, vol. 09, May 2014.

*Primary Examiner* — Jared Fureman
*Assistant Examiner* — Esayas Yeshaw
(74) *Attorney, Agent, or Firm* — Winston Hsu

(57) ABSTRACT

A data determination method for a supplying-end module of an induction type power supply system includes generating a current signal on a resonant coil of the supplying-end module according to a modulated signal of a receiving-end module of the induction type power supply system fed back from a resonant coil of the receiving-end module to the resonant coil of the supplying-end module; amplifying the current signal to retrieve a plurality of peak values of the current signal; setting a reference voltage according to magnitudes of the plurality of peak values; comparing the plurality of peak values with the reference voltage to generate a comparison result; and analyzing the comparison
(Continued)

result to obtain modulation data of the receiving-end module of the induction type power supply system.

36 Claims, 15 Drawing Sheets

Related U.S. Application Data a continuation-in-part of application No. 14/017,321, filed on Sep. 4, 2013, now Pat. No. 9,628,147, and a continuation-in-part of application No. 14/251,655, filed on Apr. 14, 2014, now Pat. No. 9,671,444, which is a continuation-in-part of application No. 14/017,321, filed on Sep. 4, 2013, now Pat. No. 9,628,147, which is a continuation-in-part of application No. 13/212,564, filed on Aug. 18, 2011, now Pat. No. 8,941,267, and a continuation-in-part of application No. 13/541,090, filed on Jul. 3, 2012, now Pat. No. 9,075,587, said application No. 13/212,564 is a continuation-in-part of application No. 13/154,965, filed on Jun. 7, 2011, now Pat. No. 8,810,072, said application No. 13/900,544 is a continuation-in-part of application No. 13/488,724, filed on Jun. 5, 2012, now Pat. No. 9,048,881, which is a continuation-in-part of application No. 13/154,965, filed on Jun. 7, 2011, now Pat. No. 8,810,072.

(30) Foreign Application Priority Data

| | | |
|---|---|---|
| Feb. 4, 2013 | (TW) | 102104223 A |
| May 3, 2013 | (TW) | 102115983 A |
| Jan. 8, 2014 | (TW) | 103100707 A |
| Jun. 6, 2014 | (TW) | 103119790 A |

(51) Int. Cl.

| | |
|---|---|
| *H01F 38/00* | (2006.01) |
| *H04B 5/00* | (2006.01) |
| *H02J 50/10* | (2016.01) |
| *H02J 50/80* | (2016.01) |
| *G06F 1/26* | (2006.01) |

(52) U.S. Cl.

CPC ......... *H04B 5/0031* (2013.01); *H04B 5/0075* (2013.01)

(56) References Cited

U.S. PATENT DOCUMENTS

| | | | |
|---|---|---|---|
| 5,270,998 A | 12/1993 | Uchiumi | |
| 5,734,254 A | 3/1998 | Stephens | |
| 5,987,244 A | 11/1999 | Kau | |
| 6,122,329 A | 9/2000 | Zai | |
| 6,154,375 A | 11/2000 | Majid | |
| 6,184,651 B1 | 2/2001 | Fernandez | |
| 6,345,203 B1 | 2/2002 | Mueller | |
| 7,336,929 B2 | 2/2008 | Yasuda | |
| 7,720,452 B2 | 5/2010 | Miyahara | |
| 7,791,311 B2 | 9/2010 | Sagoo | |
| 7,847,438 B2 | 12/2010 | Jin | |
| 7,939,963 B2 * | 5/2011 | Chang | H02M 3/33561 |
| | | | 307/38 |
| 8,004,235 B2 | 8/2011 | Baarman | |
| 8,041,974 B2 | 10/2011 | Lin | |
| 8,072,310 B1 | 12/2011 | Everhart | |
| 8,098,043 B2 | 1/2012 | Lin | |
| 8,183,827 B2 | 5/2012 | Lyon | |
| 8,188,619 B2 | 5/2012 | Azancot | |
| 8,217,535 B2 | 7/2012 | Uchida et al. | |
| 8,217,621 B2 | 7/2012 | Tsai et al. | |
| 8,248,024 B2 | 8/2012 | Yuan et al. | |
| 8,358,103 B2 | 1/2013 | Eastlack | |
| 8,373,387 B2 | 2/2013 | Bourilkov et al. | |
| 8,412,963 B2 | 4/2013 | Tsai et al. | |
| 8,417,359 B2 | 4/2013 | Tsai et al. | |
| 8,422,420 B1 * | 4/2013 | Gulasekaran | H04W 52/267 |
| | | | 370/252 |
| 8,541,975 B2 | 9/2013 | Park et al. | |
| 8,772,979 B2 | 7/2014 | Tsai | |
| 8,810,072 B2 | 8/2014 | Tsai | |
| 9,048,881 B2 | 6/2015 | Tsai | |
| 9,075,587 B2 | 7/2015 | Tsai | |
| 2003/0123168 A1 * | 7/2003 | Yokomizo | H04B 10/6931 |
| | | | 359/896 |
| 2005/0076102 A1 * | 4/2005 | Chen | H04L 41/0677 |
| | | | 709/220 |
| 2006/0017550 A1 | 1/2006 | Yoshida | |
| 2007/0177533 A1 | 8/2007 | Palay | |
| 2008/0030398 A1 | 2/2008 | Nakamura | |
| 2008/0079392 A1 | 4/2008 | Baarman | |
| 2008/0231120 A1 | 9/2008 | Jin | |
| 2009/0009006 A1 | 1/2009 | Jin | |
| 2009/0026844 A1 | 1/2009 | Iisaka | |
| 2009/0033294 A1 | 2/2009 | Odajima | |
| 2009/0174263 A1 | 7/2009 | Baarman | |
| 2009/0267561 A1 | 10/2009 | Lin | |
| 2009/0271048 A1 | 10/2009 | Wakamatsu | |
| 2009/0284082 A1 | 11/2009 | Mohammadian | |
| 2009/0302800 A1 | 12/2009 | Shiozaki | |
| 2009/0322280 A1 | 12/2009 | Kamijo | |
| 2010/0007307 A1 | 1/2010 | Baarman | |
| 2010/0171369 A1 | 7/2010 | Baarman | |
| 2010/0237943 A1 * | 9/2010 | Kim | H03F 3/45475 |
| | | | 330/254 |
| 2010/0270867 A1 | 10/2010 | Abe | |
| 2010/0277003 A1 | 11/2010 | Von Novak et al. | |
| 2010/0279606 A1 | 11/2010 | Hillan | |
| 2011/0065398 A1 | 3/2011 | Liu | |
| 2011/0136550 A1 | 6/2011 | Maugars | |
| 2011/0158329 A1 | 6/2011 | Oettinger | |
| 2011/0159812 A1 | 6/2011 | Kim | |
| 2011/0176589 A1 | 7/2011 | Kolof | |
| 2011/0196544 A1 | 8/2011 | Baarman | |
| 2011/0204723 A1 | 8/2011 | Irish | |
| 2011/0264945 A1 | 10/2011 | Tsai | |
| 2011/0285212 A1 | 11/2011 | Higuma | |
| 2012/0025622 A1 | 2/2012 | Kim | |
| 2012/0149303 A1 | 6/2012 | Moes | |
| 2012/0153739 A1 * | 6/2012 | Cooper | H02J 7/025 |
| | | | 307/104 |
| 2012/0272076 A1 | 10/2012 | Tsai | |
| 2012/0293009 A1 | 11/2012 | Kim | |
| 2012/0328061 A1 | 12/2012 | Chow | |
| 2013/0015705 A1 | 1/2013 | Abe | |
| 2013/0049484 A1 * | 2/2013 | Weissentern | H02J 5/005 |
| | | | 307/104 |
| 2013/0055815 A1 | 3/2013 | Yanagisawa | |
| 2013/0162054 A1 | 6/2013 | Komiyama | |
| 2013/0162204 A1 | 6/2013 | Jung | |
| 2013/0175873 A1 | 7/2013 | Kwon | |
| 2013/0175937 A1 * | 7/2013 | Nakajo | H05B 37/02 |
| | | | 315/200 R |
| 2013/0176023 A1 | 7/2013 | Komiyama | |
| 2013/0234532 A1 | 9/2013 | Fells | |
| 2013/0267213 A1 * | 10/2013 | Hsu | H04W 52/0232 |
| | | | 455/418 |
| 2013/0342027 A1 | 12/2013 | Tsai | |
| 2014/0024919 A1 | 1/2014 | Metzenthen | |
| 2014/0077616 A1 | 3/2014 | Baarman | |
| 2014/0084875 A1 | 3/2014 | Liu | |
| 2014/0152251 A1 | 6/2014 | Kim | |
| 2014/0184152 A1 * | 7/2014 | Van Der Lee | H02J 5/005 |
| | | | 320/108 |
| 2014/0355314 A1 * | 12/2014 | Ryan | H02M 3/33507 |
| | | | 363/21.01 |
| 2015/0008756 A1 | 1/2015 | Lee | |
| 2015/0028875 A1 | 1/2015 | Irie | |

(56) References Cited

U.S. PATENT DOCUMENTS

| | | | |
|---|---|---|---|
| 2015/0044966 A1* | 2/2015 | Shultz | H04B 5/0012 |
| | | | 455/41.1 |
| 2015/0054355 A1 | 2/2015 | Ben-Shalom | |
| 2015/0123602 A1* | 5/2015 | Patino | H02J 7/025 |
| | | | 320/108 |
| 2015/0162054 A1 | 6/2015 | Ishizu | |
| 2015/0162785 A1* | 6/2015 | Lee | H02J 17/00 |
| | | | 307/104 |
| 2015/0285926 A1 | 10/2015 | Oettinger | |
| 2016/0241086 A1 | 8/2016 | Jung | |
| 2016/0349782 A1 | 12/2016 | Tsai | |

FOREIGN PATENT DOCUMENTS

| | | |
|---|---|---|
| CN | 1930790 A | 3/2007 |
| CN | 101106388 A | 1/2008 |
| CN | 101252293 A | 8/2008 |
| CN | 101834473 A | 9/2010 |
| CN | 101907730 A | 12/2010 |
| CN | 101978571 A | 2/2011 |
| CN | 101272063 B | 1/2012 |
| CN | 102315692 A | 1/2012 |
| CN | 102474133 A | 5/2012 |
| CN | 102710409 A | 10/2012 |
| CN | 102804619 A | 11/2012 |
| CN | 102904475 A | 1/2013 |
| CN | 103069689 A | 4/2013 |
| CN | 103248130 A | 8/2013 |
| CN | 103424133 A | 12/2013 |
| CN | 103425169 A | 12/2013 |
| CN | 103595144 A | 2/2014 |
| CN | 103852665 A | 6/2014 |
| CN | 103975497 A | 8/2014 |
| CN | 104521151 A | 4/2015 |
| CN | 104685760 A | 6/2015 |
| CN | 104734370 A | 6/2015 |
| CN | 105049008 A | 11/2015 |
| CN | 105449875 A | 3/2016 |
| CN | 205105005 U | 3/2016 |
| EP | 2608419 A2 | 6/2013 |
| EP | 2 793 355 A1 | 10/2014 |
| JP | 200660909 A | 3/2006 |
| JP | 2008206305 A | 9/2008 |
| JP | 2010213414 A | 9/2010 |
| JP | 2013135518 A | 7/2013 |
| JP | 2014171371 A | 9/2014 |
| JP | 2017511117 A | 4/2017 |
| KR | 100650628 B1 | 11/2006 |
| TW | M246884 | 10/2004 |
| TW | 200527302 | 8/2005 |
| TW | 201018042 | 5/2010 |
| TW | 201034334 A1 | 9/2010 |
| TW | 201123673 | 7/2011 |
| TW | 201123676 | 7/2011 |
| TW | 201128972 | 8/2011 |
| TW | 201138258 | 11/2011 |
| TW | 201234871 | 8/2012 |
| TW | 201243281 | 11/2012 |
| TW | 201251389 | 12/2012 |
| TW | I389416 | 3/2013 |
| TW | 201315082 | 4/2013 |
| TW | I408861 | 9/2013 |
| TW | 201412047 | 3/2014 |
| TW | 201414130 | 4/2014 |
| TW | 201415752 | 4/2014 |
| TW | 201417445 | 5/2014 |
| TW | 201440368 A | 10/2014 |
| TW | I459676 B | 11/2014 |
| TW | I472897 | 2/2015 |
| TW | I483509 B | 5/2015 |
| WO | 2009149464 A2 | 12/2009 |
| WO | 2013043974 A2 | 3/2013 |
| WO | 2015154086 A1 | 10/2015 |

* cited by examiner

DATA DETERMINATION METHOD FOR SUPPLYING-END MODULE OF INDUCTION TYPE POWER SUPPLY SYSTEM AND RELATED SUPPLYING-END MODULE

CROSS REFERENCE TO RELATED APPLICATIONS

This application is a continuation-in-part of U.S. application Ser. No. 14/251,655 filed on Apr. 14, 2014, a continuation-in-part of U.S. application Ser. No. 14/017,321 filed on Sep. 4, 2013 and a continuation-in-part of U.S. application Ser. No. 13/900,544 filed on May 23, 2013, wherein U.S. application Ser. No. 14/251,655 is further a continuation-in-part of U.S. application Ser. No. 14/017,321, and U.S. application Ser. No. 14/017,321 is further a continuation-in-part of U.S. application Ser. No. 13/212,564, filed on Aug. 18, 2011 and a continuation-in-part of U.S. application Ser. No. 13/541,090, filed on Jul. 3, 2012, wherein U.S. application Ser. No. 13/212,564 is further a continuation-in-part of U.S. application Ser. No. 13/154,965, filed on Jun. 7, 2011. U.S. application Ser. No. 13/900,544 is further a continuation-in-part of U.S. application Ser. No. 13/488,724 filed on Jun. 5, 2012, which is further a continuation-in-part of U.S. application Ser. No. 13/154,965. The contents of these applications are incorporated herein by reference.

BACKGROUND OF THE INVENTION

1. Field of the Invention

The present invention relates to a data determination method for a supplying-end module of an induction type power supply system and a related supplying-end module, and more particularly, to a supplying-end module of an induction type power supply system and a data determination method for the supplying-end module capable of obtaining modulation data from the receiving end.

2. Description of the Prior Art

For safety purposes, a power supply device of an induction type power supply system has to ensure that a proper power receiving device is positioned on the sensing area of a supplying-end coil of the power supply device, and that the power receiving device is ready to receive power before the power is supplied. In order to allow the power supply device to confirm the above conditions, a data code should be transmitted for identification purposes. The data code transmission is performed via the following steps: the power supply device drives the supplying-end coil to generate resonance and sends electromagnetic power to the power receiving device in order to transmit power. When the power receiving device receives the power, the power receiving device may change the impedance on the receiving-end coil via the signal modulation technology, and the variations are fed back to vary the amplitude of carriers on the supplying-end coil.

Wireless power standard Qi, which is a standard of short-distance wireless inductive power transmission developed by the Wireless Power Consortium (WPC), has a main purpose to provide a general and facilitating wireless charging for mobile devices and portable electronics. In a Qi system, a data format of universal asynchronous receiver transmitter (UART) is applied for data transmission, wherein the non-return-to-zero (NRZ) line code is utilized as the encoding scheme of data. According to the wireless power standard Qi, the clock frequency of the NRZ line code is 2 kilohertz (kHz); hence, the corresponding cycle is 0.5 millisecond (ms) and each cycle includes two sub-cycles with a length equal to 0.25 ms. The output data can be determined according to signal transition in the corresponding sub-cycles.

In general, the frequency of carrier signals on the coil of an induction type power supply system is substantially equal to 100-200 kHz; hence, the 2 kHz UART signals retrieved by the supplying end are first filtered by a low-pass filter circuit, and then demodulated via AC coupling and/or amplifying, in order to retrieve low frequency signals. This method has the following drawbacks. First, the low-pass filter is designed for a specific frequency, so its corresponding hardware circuit can only be utilized for the specific frequency. Presently the low-pass filter is designed based on the 2 kHz data format, and if another communication protocol is applied or the signal frequency changes afterward, this hardware circuit will not be utilized; this results in poor universality and flexibility. Second, the conventional demodulation technology requires the amplifications of voltage and current signals on the coil in the beginning, wherein the amplification ratio is fixed. When the signals enter the back end for further analyzing, small signals cannot be successfully analyzed if the amplification ratio is not large enough; and noises may easily be mixed into the signals if the amplification is too large. In addition, different from general wireless communication systems, the voltages and currents on the coil of the induction type power supply system may easily be influenced by the receiving-end loading. The dynamic load variations may influence the demodulation result and even cause a failed demodulation. Third, the conventional demodulation scheme has a poor performance in the wireless transmission when the transmitted power is large, because voltage variations on the coil may decrease with the increase in transmitted power, which results in lower signal determination capability and the allowed power is thereby limited. Fourth, the accuracy of each demodulation data can only be checked after the data is received. If any of the data bits is wrong, the data should be discarded, where the wrong data bits cannot be found out and corrected to the accurate data.

Thus, there is a need to provide a data determination method allowing the supplying-end module to effectively obtain the modulation data, in order to overcome the above-mentioned problems.

SUMMARY OF THE INVENTION

It is therefore an objective of the present invention to provide a supplying-end module of an induction type power supply system and a related data determination method, in order to effectively obtain the modulation data from a receiving-end module.

The present invention discloses a data determination method for a supplying-end module of an induction type power supply system. The data determination method comprises generating a current signal on a resonant coil of the supplying-end module according to a modulated signal of a receiving-end module of the induction type power supply system fed back from a resonant coil of the receiving-end module to the resonant coil of the supplying-end module; amplifying the current signal to retrieve a plurality of peak values of the current signal; setting a reference voltage according to magnitudes of the plurality of peak values; comparing the plurality of peak values with the reference voltage to generate a comparison result; and analyzing the comparison result to obtain modulation data of the receiving-end module of the induction type power supply system.

The present invention further discloses a supplying-end module for an induction type power supply system. The supplying-end module comprises a current sensing element for generating a current signal on a resonant coil of the supplying-end module according to a modulated signal of a receiving-end module of the induction type power supply system fed back from a resonant coil of the receiving-end module to the resonant coil of the supplying-end module; at least one amplifier for amplifying the current signal to retrieve a plurality of peak values of the current signal; a voltage setting unit for setting a reference voltage according to magnitudes of the plurality of peak values; a comparator for comparing the plurality of peak values with the reference voltage to generate a comparison result; and a control unit for analyzing the comparison result to obtain modulation data of the receiving-end module of the induction type power supply system.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
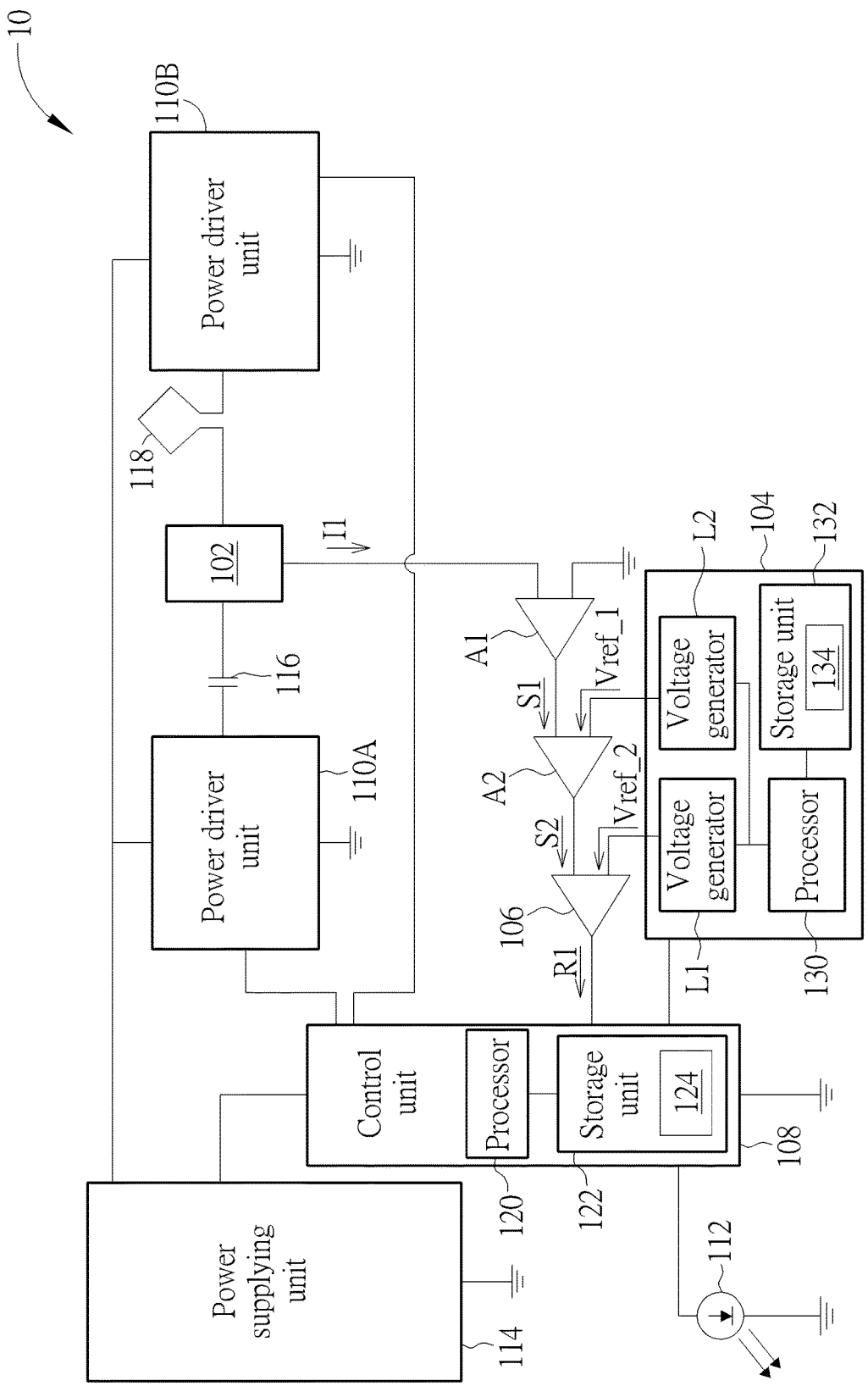
FIG. 1 is a schematic diagram of a supplying-end module according to an embodiment of the present invention.

Please refer to FIG. 1, which is a schematic diagram of a supplying-end module 10 according to an embodiment of the present invention. As shown in FIG. 1, the supplying-end module 10 includes a current sensing element 102, amplifiers A1 and A2, a voltage setting unit 104, a comparator 106, a control unit 108, power driver units 110A and 110B, a display unit 112, a power supplying unit 114, a resonant capacitor 116 and a supplying-end coil 118. The current sensing element 102 may generate a current signal I1 according to a modulated signal from a receiving-end module of an induction type power supply system sensed by the supplying-end coil 118. The amplifiers A1 and A2 may be utilized for amplifying the current signal I1 to retrieve a plurality of peak values of the current signal I1. The amplifier A1 may retrieve the positive half-cycle part of the current signal I1 and perform a first stage amplification on the positive half-cycle part, in order to generate a half-cycle signal S1. The amplifier A2, electrically connected to the amplifier A1, may perform a second stage amplification on the peak values of the half-cycle signal S1 according to a reference voltage Vref_1, in order to generate the amplified signal S2. In other words, the amplifier A2 is utilized for amplifying the peaks in the positive half cycles of the current signal I1. The voltage setting unit 104 includes voltage generators L1 and L2, a processor 130 and a storage unit 132. The voltage setting unit 104 may set the reference voltages Vref_1 and Vref_2 according to the magnitudes of the peak values, wherein the reference voltages Vref_1 and Vref_2 are provided for the voltage generators L1 and L2, respectively. The voltage generator L1, electrically connected to the amplifier A2, is utilized for outputting the reference voltage Vref_1 to the amplifier A2. The voltage generator L2, electrically connected to the comparator 106, is utilized for outputting the reference voltage Vref_2 to the comparator 106. The storage unit 132 includes a program 134 for instructing the processor 130 to set the reference voltages Vref_1 and Vref_2 according to the magnitudes of the peak values. The comparator 106 is utilized for comparing the peak values with the reference voltage Vref_2 to generate a comparison result R1. The control unit 108, which includes a processor 120 and a storage unit 122, is utilized for analyzing the comparison result R1 to obtain modulation data of the receiving-end module of the induction type power supply system. The storage unit 122 includes a program 124 for instructing the processor 120 to analyze the comparison result R1 to obtain the modulation data of the receiving-end module of the induction type power supply system. The operations of the power driver units 110A and 110B, the display unit 112, the power supplying unit 114, the resonant capacitor 116 and the supplying-end coil 118 are disclosed in U.S. Publication No. 2014/0203822 A1, and will not be narrated herein.

Figure 2:
FIG. 2 is a waveform diagram of the amplified signal generated from the half-cycle signal amplified by the amplifier.

When the receiving-end module of the induction type power supply system generates a modulated signal, the supplying-end coil 118 of the supplying-end module 10 may perform coupling with the receiving-end coil, so that AC signal variations may be generated on the voltages and currents of the supplying-end coil 118. The current sensing element 102 may detect the current variations on the supplying-end coil 118 and generate the current signal I1 accordingly. The current sensing element 102 may be a resistor, a Hall Effect current sensor or other elements capable of current sensing functions; this is not limited herein. The current signal I1 then passes through the amplifier A1 and its positive half-cycle parts are retrieved, in order to generate the half-cycle signal S1 after the amplification. In other embodiments, the amplifier A1 may retrieve the negative half-cycle parts of the current signal I1, which is inversely amplified and then undergoes subsequent processing, which is not limited herein. In order to determine slight variations on the current signal I1, the half-cycle signal S1 may further be processed by the amplifier A2 to retrieve its peaks, which is amplified to generate the amplified signal S2. Please refer to FIG. 2, which is a waveform diagram of the amplified signal S2 generated from the half-cycle signal S1 amplified by the amplifier A2. As shown in FIG. 2, the reference voltage Vref_1 may be utilized for retrieving peaks of the half-cycle signal S1, and the amplified signal S2 is the amplification result of the peaks of the half-cycle signal S1. After undergoing the first stage amplification (via the amplifier A1), difference between high and low peak signals can be seen on the waveform of the half-cycle signal S1, but this difference is unobvious. Therefore, the half-cycle signal S1 may undergo the second stage amplification (via the amplifier A2), and the reference voltage Vref_1 is set to amplify the peaks of the half-cycle signal S1, in order to generate the amplified signal S2. As a result, the comparator 106 may easily compare the amplified signal S2 and the reference voltage Vref_2, in order to generate the comparison result R1.

The circuit structure of the abovementioned amplifiers A1 and A2, voltage generators L1 and L2 and comparator 106 is only one of various implementations for retrieving the peaks of the current signal I1. In other embodiments, the present invention may also apply other methods to retrieve the variations on the peaks of the current signal I1. For example, three amplifiers may be applied so the current signal I1 may pass through three stages of amplifications to retrieve the signal. Otherwise, if performance of the amplifier is better, only one stage of amplification may be enough. Please note that the present invention may directly retrieve the modulated signal on the frequency of the carrier signals of the supplying-end coil 118 of the induction type power supply system without performing filtering on the signal; hence, the filter complying with a specific frequency may not be required, and the problem that noises are easily mixed into the signals during the filtering procedure may also be prevented.

As mentioned above, the signal utilized for determining the modulation data is the current signal I1, which is generated according to the current flowing through the supplying-end coil 118 of the supplying-end module 10. Since the signals on the coil of the induction type power supply system are always accompanied by power transmission, these signals are easily interfered by the load of the induction type power supply system. Among the signals modulated in the receiving end and fed back to the supplying-end coil, the current signals have smaller variations in light load or no load, and the variations on the current signals may increase with the increasing load according to the characteristics of the general induction type power supply system. On the contrary, the voltage signals have larger variations in light load or no load, and the variations on the voltage signals may decrease with the increasing load. Preferably, the present invention performs data determination based on the current variations on the coil. As long as the modulated signal may be retrieved successfully with no load, after more loads are added, the modulated signal may not become weaker and thus difficult to be analyzed. In other words, if data determination is performed based on the voltage variations on the coil, the voltage variations will become weak and difficult to be analyzed when the load increases to cause the transmitted power to exceed a specific value, so that data may not be determined successfully. This limits the power supply performance of the induction type power supply system.

Figure 3:
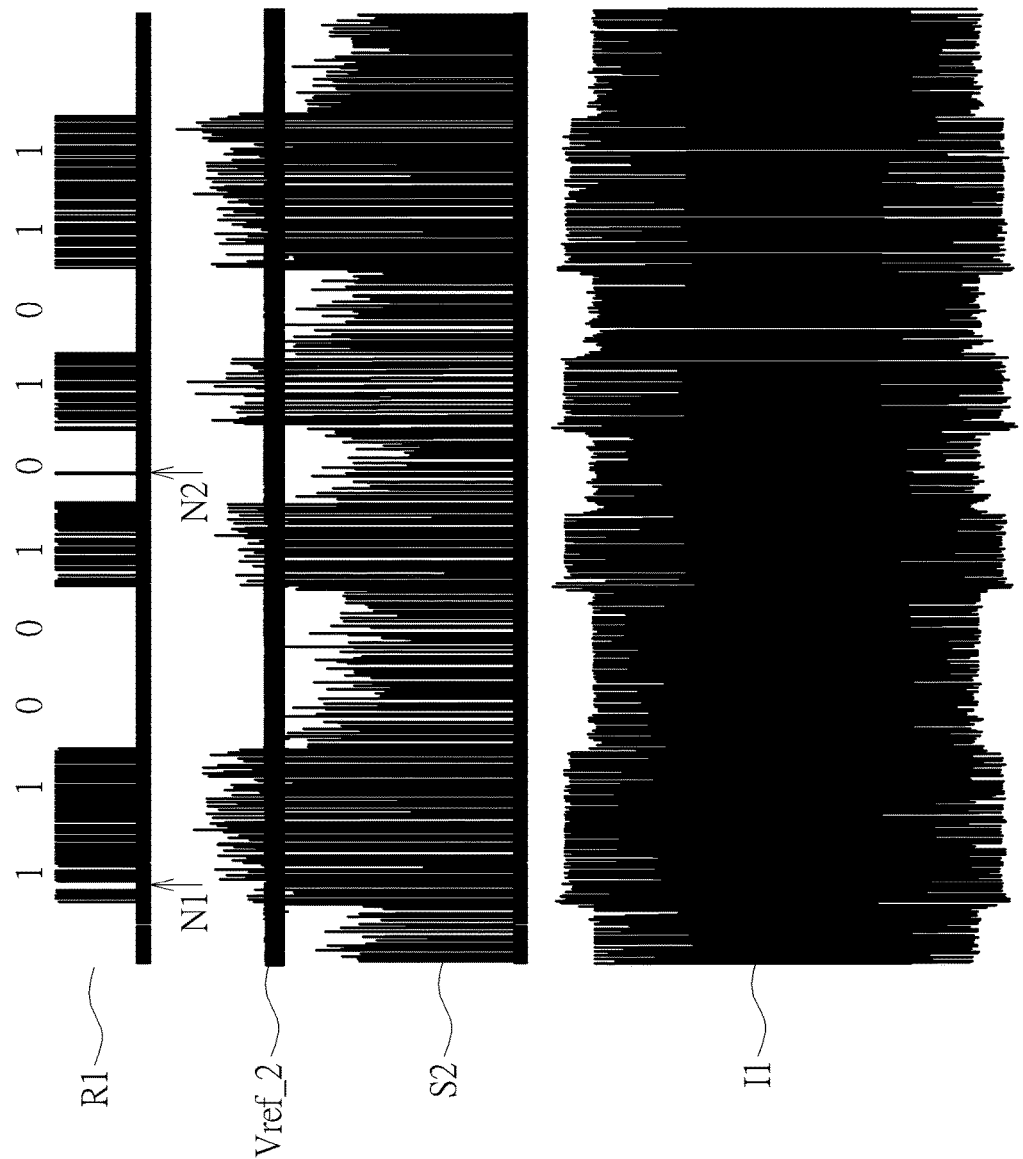
FIG. 3 is a waveform diagram of several signals according to an embodiment of the present invention.

Please refer to FIG. 3, which is a waveform diagram of several signals according to an embodiment of the present invention. FIG. 3 illustrates the comparison result R1, the amplified signal S2, the reference voltage Vref_2 and the current signal I1. The current signal I1 is a signal retrieved from current variations on the supplying-end coil 118 via the current sensing element 102. The amplified signal S2 is generated by retrieving and amplifying the positive half-cycle parts of the current signal I1 after the current signal I1 is retrieved. The comparison result R1 is generated by the comparator 106, which compares the amplified signal S2 with the reference voltage Vref_2. As shown in FIG. 3, the current signal I1 is a sine wave with a higher frequency (e.g. 100-200 kilohertz (kHz)), and the corresponding amplified signal S2 is also a sine wave in positive half-cycles with the higher frequency. The comparator 106 may compare the peak values of the amplified signal S2 with the reference voltage Vref_2, in order to generate the comparison result R1. When a peak value of the amplified signal S2 is greater than the reference voltage Vref_2, the comparator 106 may output a trigger signal in the comparison result R1. When a peak value of the amplified signal S2 is smaller than the reference voltage Vref_2, the comparator 106 may output a non-trigger signal in the comparison result R1. The modulated signal is modulated on the higher frequency sine wave with a lower frequency (e.g. 2 kHz). The amplified signal S2 may possess more obvious rises and falls corresponding to the modulated signal after undergoing the amplifications. As shown in FIG. 3, in the amplified signal S2, there exist higher peak values during a period and lower peak values during another period, wherein several irregular fluctuations may be caused by noises. When the reference voltage Vref_2 is set to a voltage level capable of determining higher peak values and lower peak values, the comparison result R1 can thereby be utilized for separating the noises and demodulating the data in different periods. For example, the comparison result R1 shown in FIG. 3 is "1100101011".

There may be several erroneous output signals in the comparison result R1 (e.g. N1 and N2 shown in FIG. 3) due to noise interferences. However, each data bit includes multiple signals, and the accurate data may still be determined as long as the number of wrong signals is limited within a specific range. For example, if the frequency of signals on the coil is 200 kHz and the frequency of the modulation data is 2 kHz, there may be 100 signals per data bit. Therefore, the control unit 108 may define that if 90 or more signals in the comparison result R1 corresponding to a data bit are trigger signals, the data bit may be determined to correspond to a trigger section and output as logic "1", and that if 90 or more signals in the comparison result R1 corresponding to a data bit are non-trigger signals, the data bit may be determined to correspond to a non-trigger section and output as logic "0". In such a situation, there is a tolerance of 10% error rate for the modulated signals. The control unit 108 may adjust the setting of error tolerance for data determination according to system stability or data importance; this is not limited herein.

The above data determination method may obtain the modulation data from the receiving-end module according to the comparison result R1. However, in order to successfully implement the data determination method, the present invention still need to solve several problems, such as how to determine the starting time and length of each data cycle, how to adapt to variations on peak values of the current signal due to load variations, and how to handle the determination if a data bit is difficult to be determined (to correspond to the trigger section or the non-trigger section).

First of all, the control unit 108 may perform an initialization process before performing the determination of the modulation data. Since the induction type power supply system applies the data format of universal asynchronous receiver transmitter (UART) for data transmission, wherein the non-return-to-zero (NRZ) line code is utilized as the encoding scheme of data, the initialization process may be performed based on the characteristics of the data format of UART and NRZ line code.

Figure 4:
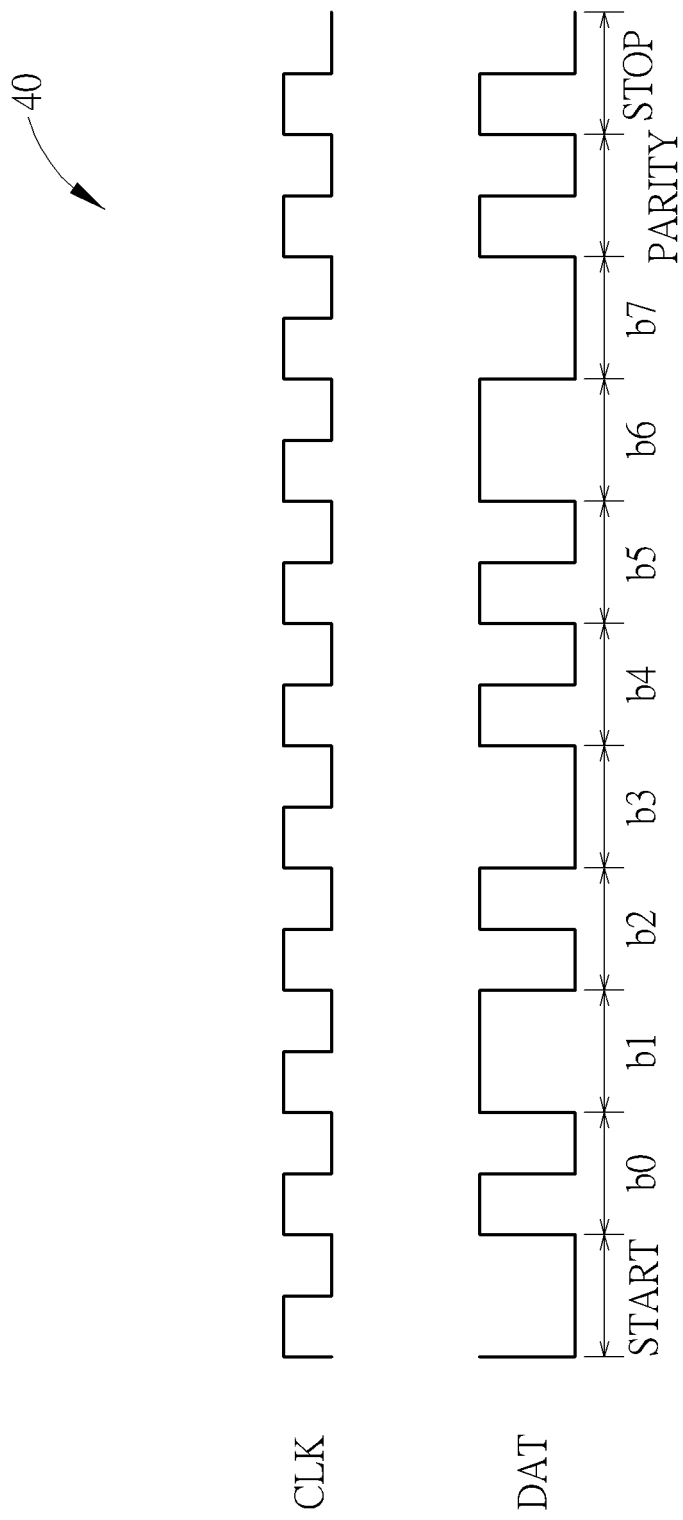
FIG. 4 is a schematic diagram of a data format of the induction type power supply system.

Please refer to FIG. 4, which is a schematic diagram of a data format of the induction type power supply system. As shown in FIG. 4, the receiving-end module may transmit 1 byte of modulation data DAT to the supplying-end module 10. The modulation data DAT includes a start bit START, 8 data bits b0-b7, a parity checking code PARTIY and a stop bit STOP, where each bit may correspond to a cycle of a clock CLK. According to the encoding scheme of the NRZ line code, the encoding of each bit may start at the positive edge of the clock CLK in each cycle. The signal corresponding to the modulation data DAT may be switched between a lower voltage level and a higher voltage level, and the signal transition occurs at a positive edge or a negative edge of the clock CLK. If the voltage level of the signal is not switched in a clock CLK cycle, the data bit corresponding to this cycle is encoded to logic "0". If the voltage level of the signal is switched in a clock CLK cycle, the data bit corresponding to this cycle is encoded to logic "1". In short, for each cycle of the clock CLK, the corresponding data bit is logic "0" if signal transition does not occur within the cycle, and the corresponding data bit is logic "1" if signal transition occurs within the cycle. According to the data format of UART, the signals of the start bit START are two lower voltage signals in two consecutive sub-cycles (e.g. two signals without transition), which represents logic "0". The stop bit STOP is logic "1". The parity checking code PARTIY may apply the odd parity check. In detail, if the data bits b0-b7 include even numbers of "1", the parity checking code PARTIY is equal to "1"; and if the data bits b0-b7 include odd numbers of "1", the parity checking code PARTIY is equal to "0".

According to the data transmission standard of the induction type power supply system, transmission frequency of one data bit is 2 kHz with 4% tolerance; hence, the length of each bit is substantially equal to 0.5 millisecond (ms). According to the encoding scheme of the NRZ line code, the frequency of signal transition is double of the frequency of the data bit. Therefore, the cycle of signal transition (i.e. the shortest length of a signal remaining in the lower voltage level or the higher voltage level) is substantially equal to half a data cycle, i.e. 0.25 ms. The 0.5 ms for a data bit is called a data cycle and the 0.25 ms for signal transition is called a sub-data cycle hereinafter. In addition, the signal status in each sub-data cycle corresponds to a sub-data bit. For example, a sub-data bit corresponding to the higher voltage level may be equal to logic "1", and a sub-data bit corresponding to the lower voltage level may be equal to logic "0". Please note that the above encoding scheme is only for one byte of data, and in other embodiments, the receiving-end module may also continuously transmit multiple bytes of modulation data to the supplying-end module 10. The transmitted data quantity may be adjusted according to system requirements, and the data format may also apply other standards or criterions, which are not limited herein.

Figure 5:
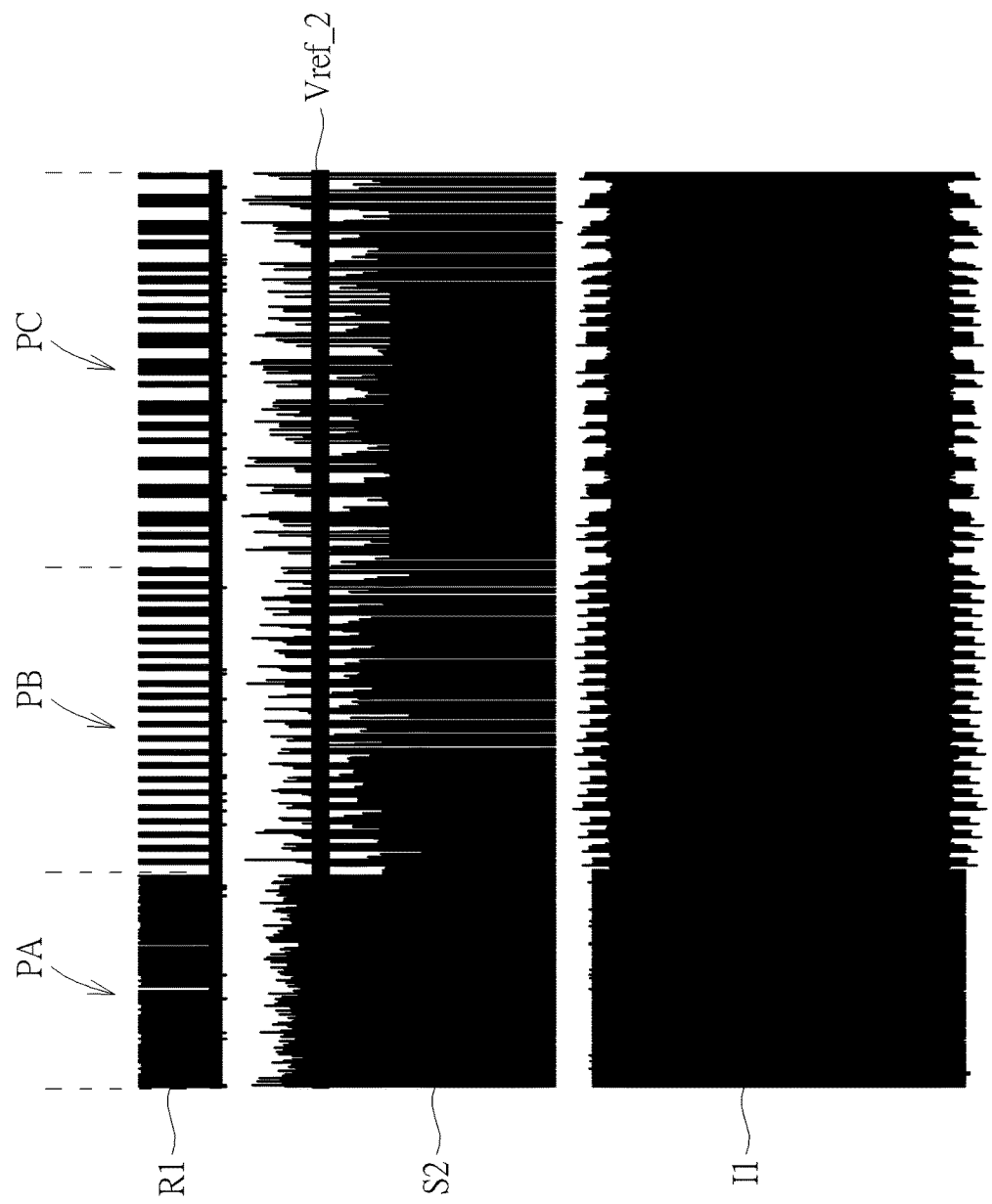
FIG. 5 is a waveform diagram of modulation data according to an embodiment of the present invention.

Please refer to FIG. 5, which is a waveform diagram of modulation data according to an embodiment of the present invention. As shown in FIG. 5, when the receiving-end module does not perform signal modulation, peak values of the amplified signal S2 may keep in a voltage level slightly higher than the reference voltage Vref_2 (e.g. the period PA). At this moment, the comparison result R1 may continuously output trigger signals, or seldom output non-trigger signals scattered within the section of trigger signals due to noise interferences. When a power receiving device is put on the receiving end, the receiving-end module may start to send modulated signals. In such a condition, the amplified signal S2 appears to have multiple consecutive peak values lower than the voltage level of the reference voltage Vref_2, so that the comparison result R1 starts to output multiple consecutive non-trigger signals. According to the data format of the induction type power supply system, the receiving-end module may transmit a pre-launch signal (e.g. the period PB) before the transmission of modulation data. The pre-launch signal is a series of consecutive sub-data bits "010101 . . . ", where "0" and "1" are transmitted alternately, and the length of each sub-data bit is equal to one sub-data cycle. In detail, assume that the carrier frequency of the amplified signal S2 is 200 kHz, which corresponds to a carrier cycle of 0.005 ms. If the length of a sub-data cycle is 0.25 ms, each sub-data cycle may cover 50 peaks of the carrier. In such a situation, during the period when the pre-launch signal is transmitted, if there is no noise interference in the signal transmission path, the comparison result R1 may appear to be 50 consecutive trigger signals followed by 50 consecutive non-trigger signals, which is further followed by 50 consecutive trigger signals, and so on. After transmission of the pre-launch signal is completed, the receiving-end module may transmit two logic "0" in two consecutive sub-data bits (i.e. the comparison result R1 has 100 consecutive non-trigger signals), which can be regarded as the start bit START shown in FIG. 4, and then start to transmit the modulation data (e.g. the period PC).

Figure 6A:
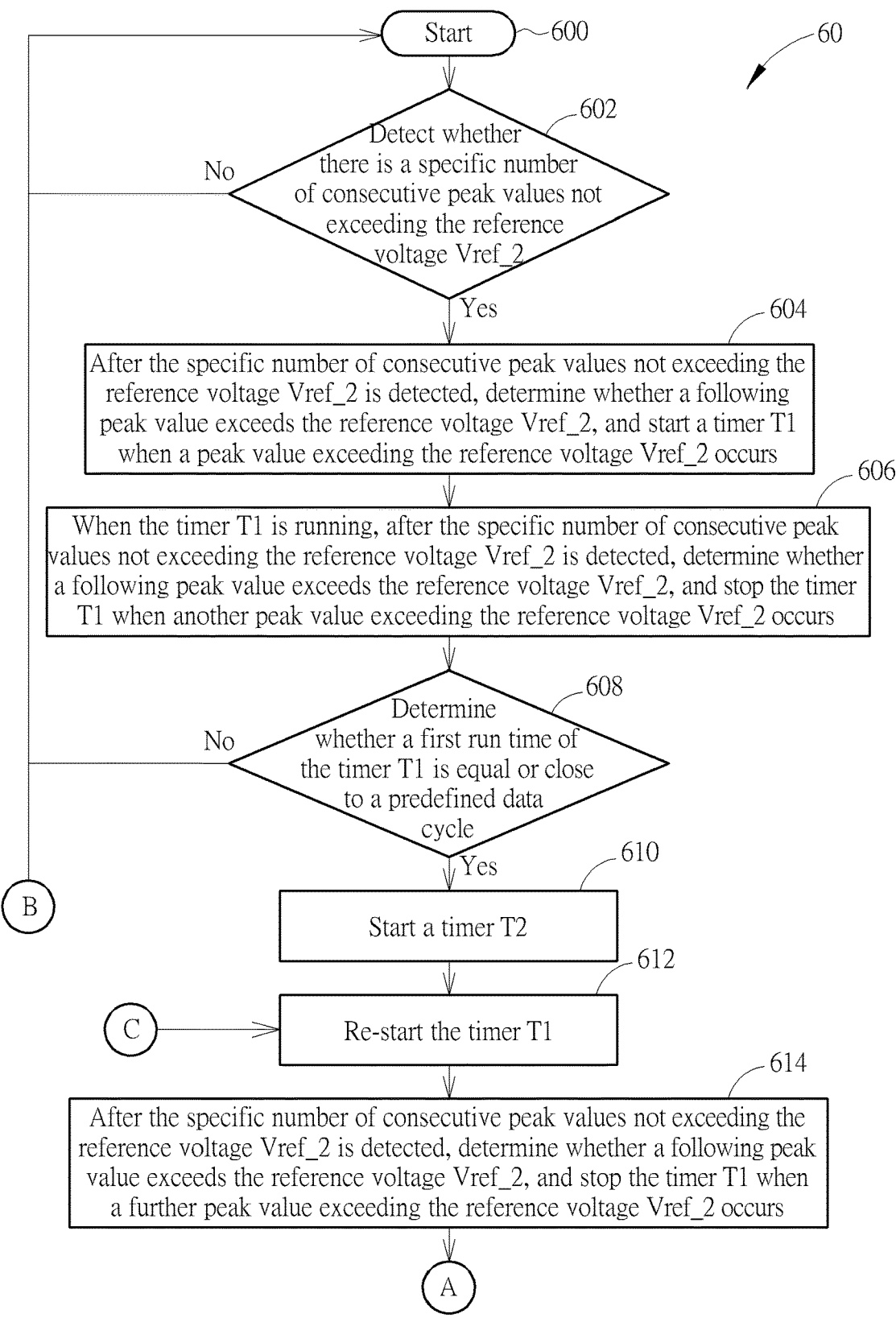
FIG. 6A and FIG. 6B are schematic diagrams of an initialization process according to an embodiment of the present invention.
Figure 6B:
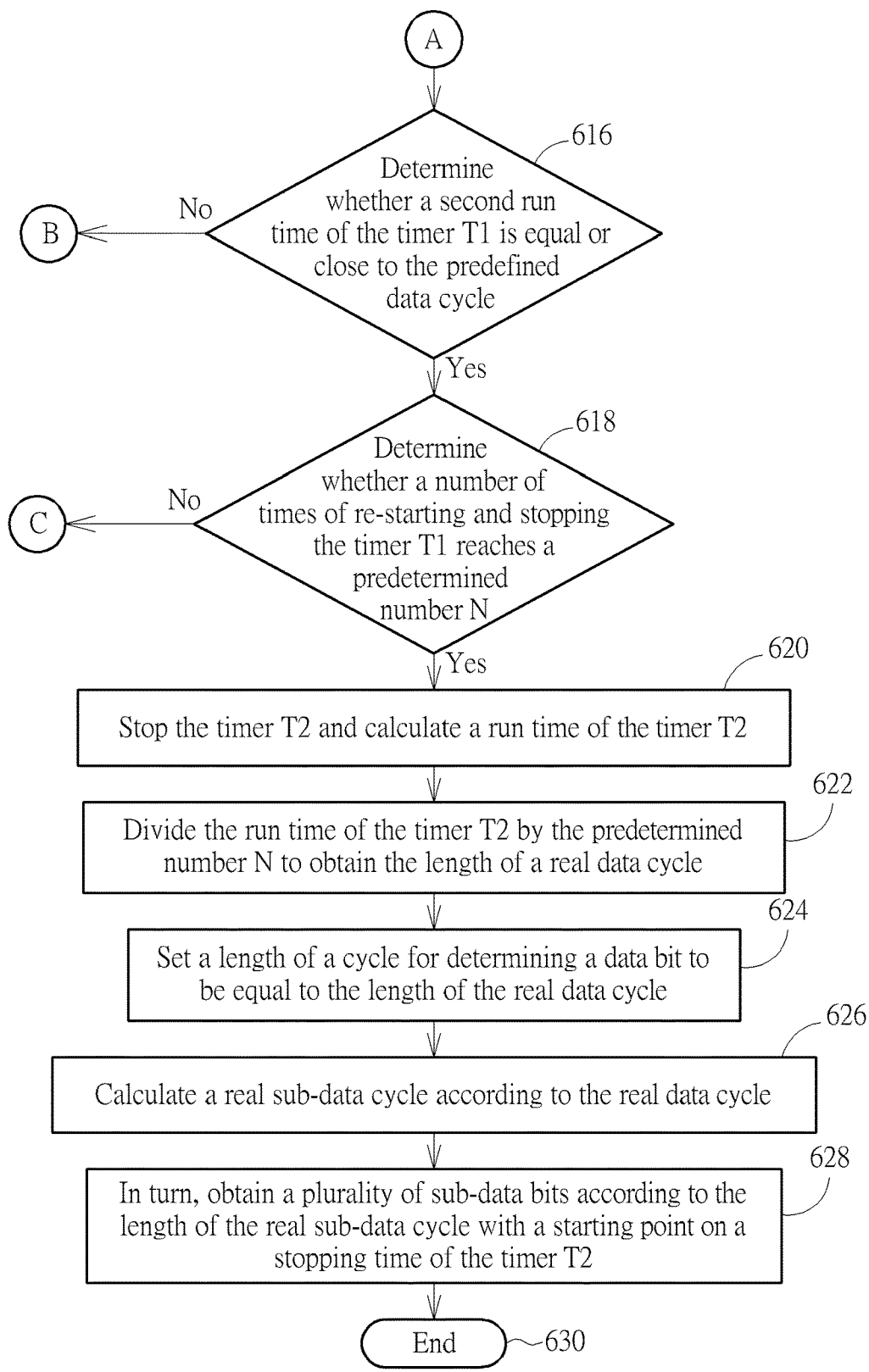

When the supplying-end module 10 receives the pre-launch signal, the control unit 108 may start to perform an initialization process. Please refer to FIG. 6A and FIG. 6B, which are schematic diagrams of an initialization process 60 according to an embodiment of the present invention. As shown in FIG. 6A and FIG. 6B, the initialization process 60 may be compiled into the program 124, to be realized in the control unit 108. The initialization process 60 includes the following steps:

Step 600: Start.

Step 602: Detect whether there is a specific number of consecutive peak values not exceeding the reference voltage Vref_2. If yes, go to Step 604; otherwise, the process returns to Step 600.

Step 604: After the specific number of consecutive peak values not exceeding the reference voltage Vref_2 is detected, determine whether a following peak value exceeds the reference voltage Vref_2, and start a timer T1 when a peak value exceeding the reference voltage Vref_2 occurs.

Step 606: When the timer T1 is running, after the specific number of consecutive peak values not exceeding the reference voltage Vref_2 is detected, determine whether a following peak value exceeds the reference voltage Vref_2, and stop the timer T1 when another peak value exceeding the reference voltage Vref_2 occurs.

Step 608: Determine whether a first run time of the timer T1 is equal or close to a predefined data cycle. If yes, go to Step 610; otherwise, stop the initialization process 60 and return to Step 600.

Step 610: Start a timer T2.

Step 612: Re-start the timer T1.

Step 614: After the specific number of consecutive peak values not exceeding the reference voltage Vref_2 is detected, determine whether a following peak value exceeds the reference voltage Vref_2, and stop the timer T1 when a further peak value exceeding the reference voltage Vref_2 occurs.

Step 616: Determine whether a second run time of the timer T1 is equal or close to the predefined data cycle. If yes, go to Step 618; otherwise, stop the initialization process 60 and return to Step 600.

Step 618: Determine whether a number of times of re-starting and stopping the timer T1 reaches a predetermined number N. If yes, go to Step 620; otherwise, go to Step 612.

Step 620: Stop the timer T2 and calculate a run time of the timer T2.

Step 622: Divide the run time of the timer T2 by the predetermined number N to obtain the length of a real data cycle.

Step 624: Set a length of a cycle for determining a data bit to be equal to the length of the real data cycle.

Step 626: Calculate a real sub-data cycle according to the real data cycle.

Step 628: In turn, obtain a plurality of sub-data bits according to the length of the real sub-data cycle with a starting point on a stopping time of the timer T2.

Step 630: End.

According to the initialization process 60, the control unit 108 may respectively obtain the stopping time of the timer T2 and the real sub-data cycle, which are utilized for defining the starting points and lengths of the subsequent sub-data cycles, in order to obtain the modulation data. More specifically, in the initialization process 60, the starting points and lengths of the subsequent sub-data cycles are estimated according to the peak value characteristics of the current signal I1 during the period of transmitting the pre-launch signal. The peak value characteristics may include the characteristic of consecutive and alternate sub-data bits "010101 . . . " in the pre-launch signal of the UART. On the other hand, the amplifier A1 may first retrieve the peaks of the current signal I1 in the positive half cycles, which is further amplified and converted into the peaks of the amplified signal S2. Since the peak values in the initialization process 60 are compared with the reference voltage Vref_2, these peak values may be regarded as peak heights of the amplified signal S2 based on the structure of the supplying-end module 10. In addition, the peak values of the amplified signal S2 may correspond to the peak values of the current signal I1 with a positive relationship; hence, the peak values in the initialization process 60 may also directly correspond to the peak values of the current signal I1.

When the induction type power supply system is in a standby mode, the supplying-end module 10 may keep detecting the current signal I1 to determine whether the modulated signal is received; that is, to determine whether there is a specific number of consecutive peak values not exceeding the reference voltage Vref_2 in the amplified signal S2 converted from the current signal I1 (Step 602). As shown by the period PA in FIG. 5, no signal modulation occurs in the receiving end, so the peak values of the amplified signal S2 may keep in a voltage level slightly higher than the reference voltage Vref_2. At this moment, the comparison result R1 may continuously output trigger signals. When the modulated signals are received, the amplified signal S2 may appear to have multiple consecutive peak values lower than the voltage level of the reference voltage Vref_2, so that the comparison result R1 may start to output multiple consecutive non-trigger signals. The control unit 108 may set a predetermined value, in order to determine whether the number of consecutive peak values not exceeding the reference voltage Vref_2 is greater than the predetermined value (i.e. determine whether the number of consecutive non-trigger signals outputted by the comparison result R1 is greater than the predetermined value), and start to determine whether a following peak value exceeds the reference voltage Vref_2 when the number of consecutive peak values not exceeding the reference voltage Vref_2 is greater than the predetermined value (Step 604). For example, assuming that a sub-data cycle includes substantially 50 peaks of carriers, a sub-data bit with a value "0" may correspond to substantially 50 consecutive non-trigger signals of the comparison result R1. In such a situation, the predetermined value may be set to a value smaller than 50, e.g. 30; that is, when 30 consecutive peak values of the amplified signal S2 lower than the reference voltage Vref_2 are detected, the control unit 108 may start to determine whether there is a following peak value exceeding the reference voltage Vref_2. Please note that, in this embodiment, the control unit 108 should know the carrier frequency of the current signal I1 and the transmission frequency of the modulation data, in order to accurately determine the peak value numbers during each sub-data cycle.

Figure 7:
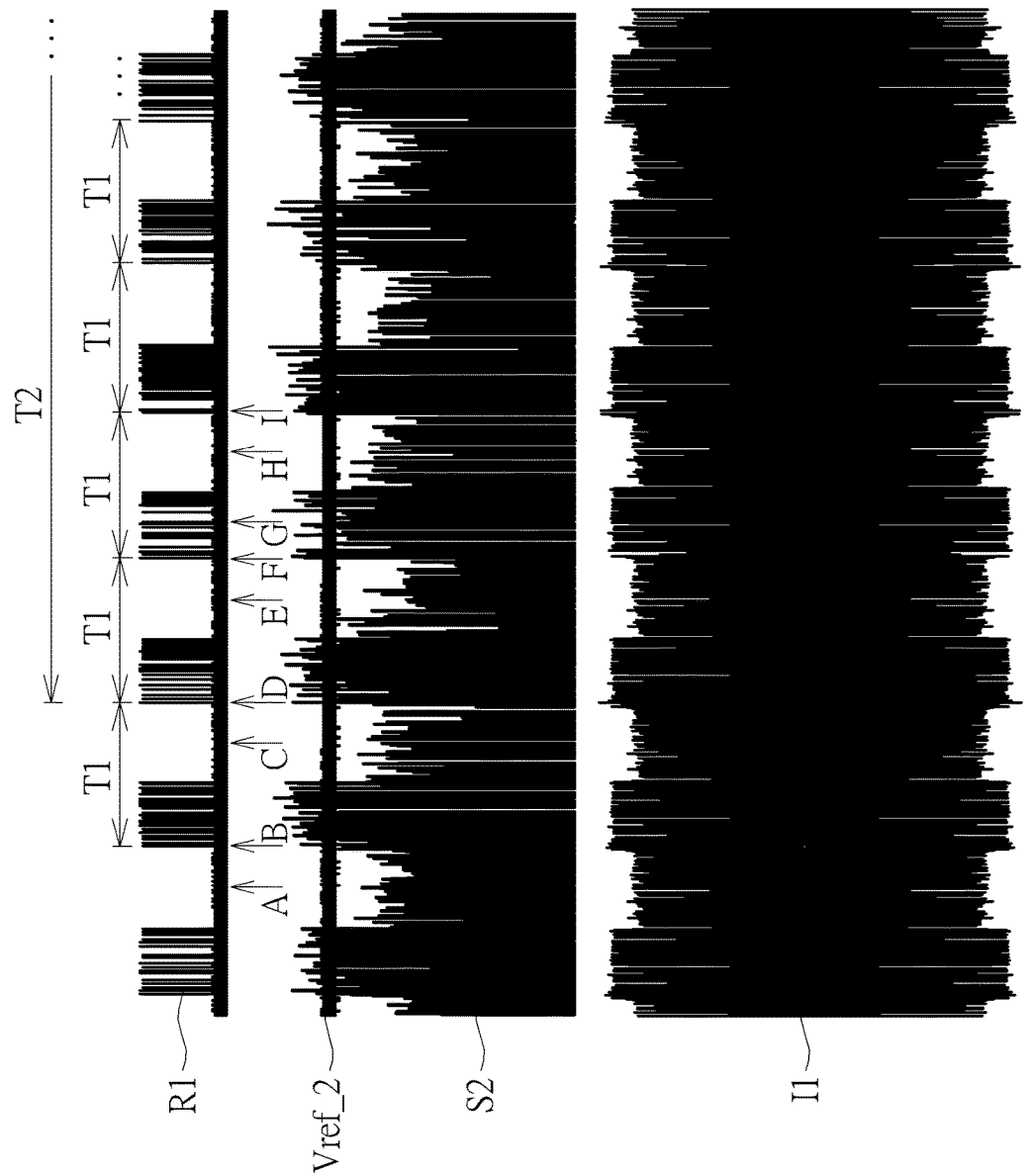
FIG. 7 is a waveform diagram of a pre-launch signal according to an embodiment of the present invention.

Please refer to FIG. 7, which is a waveform diagram of a pre-launch signal according to an embodiment of the present invention. As shown in FIG. 7, in the pre-launch signal, the sub-data bits are transmitted with a series of "010101 . . . " where "0" and "1" are transmitted alternately. Therefore, the comparison result R1 generated from the peak values of the current signal I1 may output multiple consecutive non-trigger signals, which is followed by multiple consecutive trigger signals, then multiple consecutive non-trigger signals, and so on. After multiple consecutive peak values not exceeding the voltage level of the reference voltage Vref_2 (i.e. the comparison result R1 having multiple consecutive non-trigger signals) are determined (e.g. the region A), the control unit 108 may determine there is any following peak value exceeding the reference voltage Vref_2, and start the timer T1 at the time when the first following peak value exceeding the reference voltage Vref_2 (i.e. the first trigger signal after the multiple consecutive non-trigger signals of the comparison result R1) occurs (e.g. the point B).

In order to prevent wrong determination of the peak value characteristics due to noise interferences, the control unit 108 should ensure the peak value characteristics by more times. Therefore, after starting the timer T1, the control unit 108 may detect whether the comparison result R1 outputs multiple consecutive non-trigger signals again. After multiple consecutive non-trigger signals of the comparison result R1 are detected (e.g. the region C), the control unit 108 may start to determine there is any peak value exceeding the reference voltage Vref_2, and stop the timer T1 at the time when the first peak value exceeding the reference voltage Vref_2 (i.e. the first trigger signal after the multiple consecutive non-trigger signals of the comparison result R1) occurs (e.g. the point D) (Step 606).

The control unit 108 then determines whether the run time of the timer T1 is equal or close to a predefined data cycle (Step 608). If the comparison result R1 does not interfered by noises to generate errors, the run time of the timer T1 should be equal or close to the predefined data cycle. Thus, when the run time of the timer T1 is equal or close to the predefined data cycle, the control unit 108 may start another timer T2 (Step 610). On the other hand, when the run time of the timer T1 is not equal or close to the predefined data cycle, there may be errors in the run time of the timer T1 due to noise interferences. In such a situation, the control unit 108 may stop the present initialization process 60 and re-start another initialization process 60.

Please note that the transmission frequency of a data bit is 2 kHz with 4% tolerance according to the data transmission standard of the induction type power supply system; hence, the length of each bit is substantially equal to 0.5 ms and the length of each sub-data cycle is substantially equal to 0.25 ms. In this embodiment, the run time of the timer T1 should be substantially equal to two sub-data cycles, i.e. 0.5 ms; hence, the predefined data cycle is 0.5 ms, and the control unit 108 may determine whether the run time of the timer T1 is within a range of 0.5 ms plus or minus 4%. In other embodiments, the error determination range may also be adjusted according to system requirements or noise interference conditions, and is not limited herein. For example, the control unit 108 may also determine whether the run time of the timer T1 is within a range of 0.5 ms plus or minus 10%.

When the timer T2 is running, the control unit 108 first re-starts the timer T1 (Step 612), and detects again whether the comparison result R1 outputs multiple consecutive non-trigger signals. After multiple consecutive non-trigger signals of the comparison result R1 are detected (e.g. the region E), the control unit 108 may start to determine whether there is any peak value exceeding the reference voltage Vref_2, and stop the timer T1 at the time when the first peak value exceeding the reference voltage Vref_2 (i.e. the first trigger signal after the multiple consecutive non-trigger signals of the comparison result R1) occurs (e.g. the point F) (Step 614).

Step 612 to Step 614 may be repeated several times, in order to determine the length of time or the number of peak values corresponding to each sub-data bit. The control unit 108 may configure a predetermined number N to determine whether the number of times of re-starting and stopping the timer T1 (i.e. the number of times of repeating Step 612 to Step 614) reaches the predetermined number N (Step 618). If the number does not reach the predetermined number N, the initialization process 60 returns to Step 612; if the number reaches the predetermined number N, the control unit 108 may stop the timer T2 and calculate the run time of the timer T2 (Step 620). Please note that, in order to prevent timing errors due to noise interferences, whether the run time of the timer T1 is equal or close to the predefined data cycle should be determined each time when the control unit 108 stops the timer T1 and obtains the run time of the timer T1 (Step 616). The initialization process 60 is proceeded only when the run time of the timer T1 is equal or close to the predefined data cycle. If the control unit 108 determines that the run time of the timer T1 is not equal or close to the predefined data cycle, the timer T1 may be determined to be interfered by noises. In such a situation, the control unit 108 may stop the present initialization process 60 and re-start another initialization process 60.

Please note that the predetermined number N may be configured according to the format of the pre-launch signal of the induction type power supply system. For example, the pre-launch signal may include 16 consecutive "01"; hence, the predetermined number N may be configured to any numbers smaller than 16. Preferably, the predetermined number N may be configured to 7 or 8, i.e. the number of repetitions of Step 612 to Step 614 is 7 or 8. If the predetermined number N is too large, the initialization process 60 may easily be interfered by noises and thus fail, and it is difficult to perform another complete initialization process 60 after the original initialization process 60 fails. If the predetermined number N is too small, the obtained real data cycle may possess large errors, which may result in erroneous modulation data determination and failed decoding.

The run time of the timer T2 obtained according to the above steps may be equal to the sum of N run time of the timer T1, and each of these N run time of the timer T1 is approximately equal to a time length of the predefined data cycle. Therefore, the run time of the timer T2 may approximately be equal to N time lengths of the predefined data cycle. In such a situation, the run time of the timer T2 may be divided by the predetermined number N to obtain the length of a real data cycle (Step 622). In most conditions, there may be errors in the modulation circuits and elements in the receiving end, so the receiving-end module may not accurately transmit the modulation data with the frequency exactly equal to 2 kHz. The initialization process 60 may determine the cycle of the data practically modulated by the receiving-end module according to the detected cycle of the pre-launch signal, in order to enhance the accuracy of data receiving. The control unit 108 then sets the length of a cycle for determining a data bit to be equal to the length of the real data cycle (Step 624). In order to obtain each sub-data bit of the NRZ line code, the control unit 108 may calculate the real sub-data cycle according to the real data cycle (Step 626), i.e. divide the real data cycle by two to obtain the real sub-data cycle. The control unit 108 may in turn obtain the subsequent sub-data bits according to the length of the real sub-data cycle with the starting point on the stopping time of the timer T2 (Step 628). In an embodiment, the control unit 108 may start another timer T3 on the stopping time of the timer T2, and configure the run time of the timer T3 to the length of the real sub-data cycle. The control unit 108 then repeats the operations to read each sub-data bit in each run time of the timer T3.

Please note that, noises may occur in any position of the pre-launch signal, so each output value of the comparison result R1 may be erroneous due to noise interferences. Thus, the initialization process 60 includes a mechanism for preventing wrong determination of the real data cycle due to noise interferences. Please keep referring to FIG. 7. If an error of the comparison result R1 occurs when the timer T1 is not started yet (e.g. a trigger signal of the comparison result R1 occurs in the region A), the control unit 108 may not detect that the number of consecutive non-trigger signals of the comparison result R1 reaches the predetermined value, so that the timer T1 cannot be started at the point B. In such a situation, if the comparison result R1 in the region C can still output accurately, the timer T1 may be deferred to start at the point D, and the initialization process 60 can proceed. In another situation, an error of the comparison result R1 may occur after the control unit 108 detects that the number of consecutive non-trigger signals of the comparison result R1 reaches the predetermined value, which causes the timer T1 to be started earlier. In such a situation, the run time of the timer T1 may be greater than the predefined data cycle, and the control unit 108 may stop the present initialization process 60 and re-start another initialization process 60.

In addition, an error of the comparison result R1 may also occur after the timer T1 starts to run (e.g. a trigger signal of the comparison result R1 occurs in the region C). The control unit 108 may not detect that the number of consecutive non-trigger signals of the comparison result R1 reaches the predetermined value, so that the timer T1 cannot be stopped at the point D. In such a situation, if the comparison result R1 in the region E can still output accurately, the timer T1 may be stopped at the point F. Therefore, the run time of the timer T1 is far greater than the predefined data cycle, and the control unit 108 may stop the present initialization process 60 and re-start another initialization process 60. In another situation, an error of the comparison result R1 may occur after the control unit 108 detects that the number of consecutive non-trigger signals of the comparison result R1 reaches the predetermined value, which causes the timer T1 to be stopped earlier. In such a situation, the run time of the timer T1 may be smaller than the predefined data cycle, and the control unit 108 may stop the present initialization process 60 and re-start another initialization process 60.

Furthermore, an error of the comparison result R1 may also occur during a period when the sub-data bits are logic "1" (e.g. a non-trigger signal of the comparison result R1 occurs in the region G). Inmost situations, this type of error may not influence the data cycle determination of the initialization process 60. Only when the error occurs in the first peak value of the sub-data bit (e.g. at the point F), the timer T1 may be stopped later, and the run time of the timer T1 may still within a tolerant range of the predefined data cycle. In such a situation, if the comparison result R1 in the region H outputs accurately, the timer T1 may still be stopped at the point I in the next cycle without influencing the run time of the timer T2. This error may cause the run time of the timer T2 to become erroneously longer only when it occurs at the final stop of the timer T1. However, the prolonged time is extremely small, so the influence on the real data cycle due to this error may be omitted when the predetermined number N is large enough.

Figure 8A:
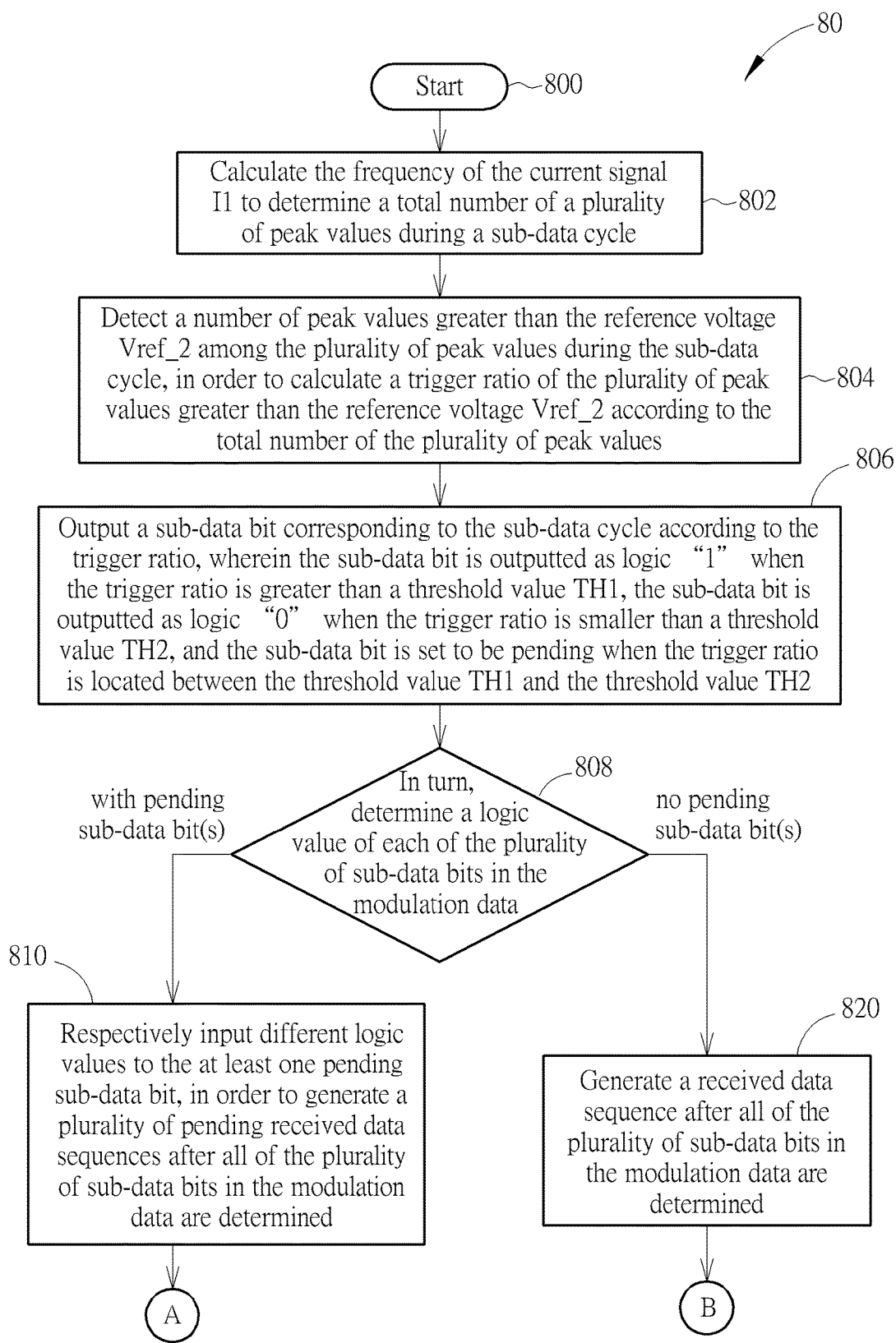
FIG. 8A and FIG. 8B are schematic diagrams of a data determination process according to an embodiment of the present invention.
Figure 8B:
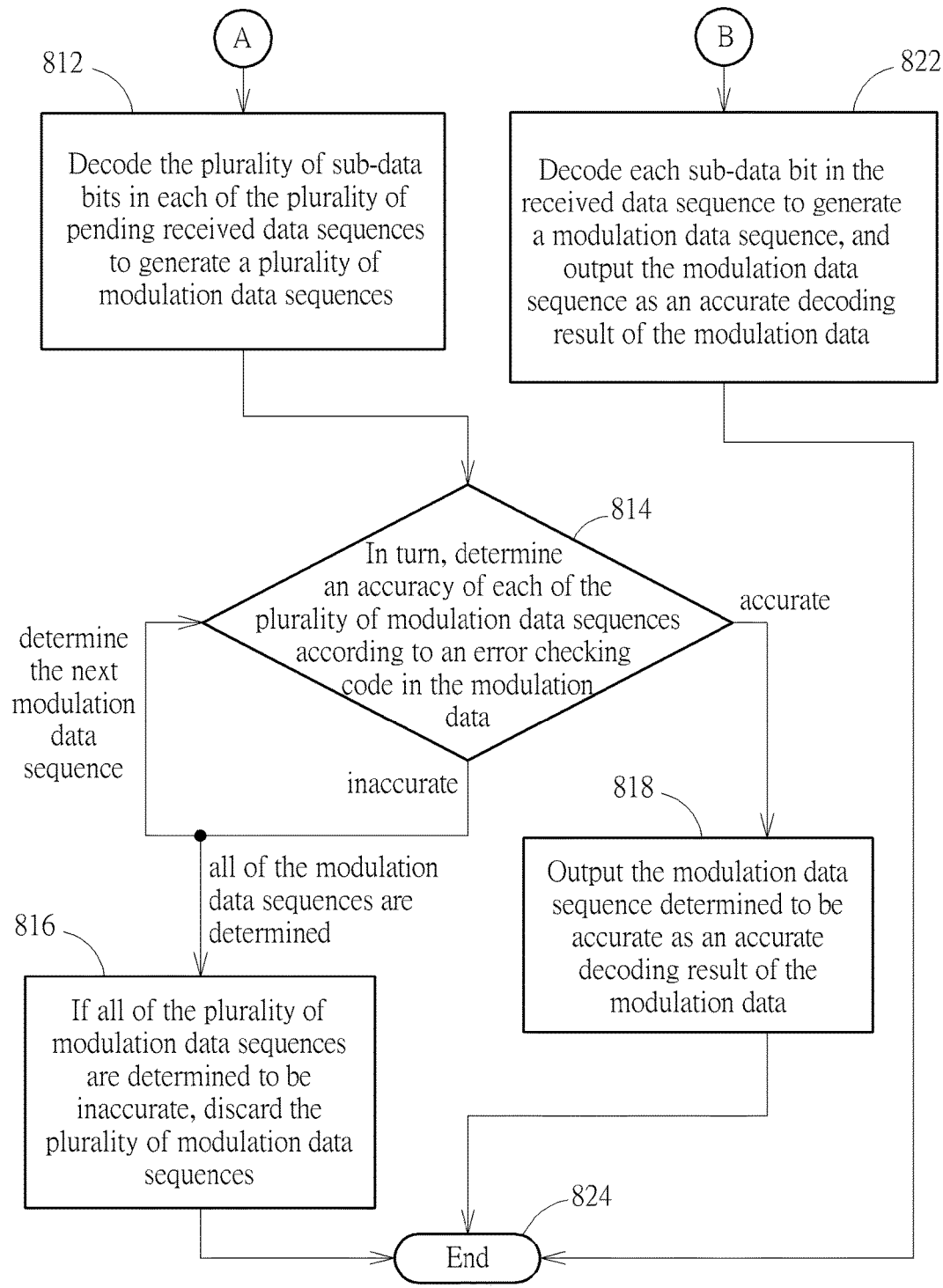

After the initialization process 60 is accomplished, the control unit 108 may obtain the length and starting point of each sub-data cycle, and determine the value of each sub-data bit accordingly. Please refer to FIG. 8A and FIG. 8B, which are schematic diagrams of a data determination process 80 according to an embodiment of the present invention. As shown in FIG. 8A and FIG. 8B, the data determination process 80 may be compiled into the program 124, to be realized in the control unit 108. The data determination process 80 includes the following steps:

Step 800: Start.

Step 802: Calculate the frequency of the current signal I1 to determine a total number of a plurality of peak values during a sub-data cycle.

Step 804: Detect a number of peak values greater than the reference voltage Vref_2 among the plurality of peak values during the sub-data cycle, in order to calculate a trigger ratio of the plurality of peak values greater than the reference voltage Vref_2 according to the total number of the plurality of peak values.

Step 806: Output a sub-data bit corresponding to the sub-data cycle according to the trigger ratio, wherein the sub-data bit is outputted as logic "1" when the trigger ratio is greater than a threshold value TH1, the sub-data bit is outputted as logic "0" when the trigger ratio is smaller than a threshold value TH2, and the sub-data bit is set to be pending when the trigger ratio is located between the threshold value TH1 and the threshold value TH2.

Step 808: In turn, determine a logic value of each of the plurality of sub-data bits in the modulation data. If there is at least one pending sub-data bit among the plurality of sub-data bits, go to Step 810; if there is no pending sub-data bit among the plurality of sub-data bits, go to Step 820.

Step 810: Respectively input different logic values to the at least one pending sub-data bit, in order to generate a plurality of pending received data sequences after all of the plurality of sub-data bits in the modulation data are determined.

Step 812: Decode the plurality of sub-data bits in each of the plurality of pending received data sequences to generate a plurality of modulation data sequences.

Step 814: In turn, determine an accuracy of each of the plurality of modulation data sequences according to an error checking code in the modulation data. If a modulation data sequence is determined to be accurate, go to Step 818; if a modulation data sequence is determined to be inaccurate, proceed Step 814 and determine the next modulation data sequence until all of the plurality of modulation data sequences are determined.

Step 816: If all of the plurality of modulation data sequences are determined to be inaccurate, discard the plurality of modulation data sequences and go to Step 824.

Step 818: Output the modulation data sequence determined to be accurate as an accurate decoding result of the modulation data, and go to Step 824.

Step 820: Generate a received data sequence after all of the plurality of sub-data bits in the modulation data are determined.

Step 822: Decode each sub-data bit in the received data sequence to generate a modulation data sequence, and output the modulation data sequence as an accurate decoding result of the modulation data.

Step 824: End.

Since the plurality of peak values of the initialization process 80 are compared with the reference voltage Vref_2, these peak values may be regarded as peak heights of the amplified signal S2 according to the structure of the supplying-end module 10. In addition, the peak values of the amplified signal S2 may correspond to the peak values of the current signal I1 with a positive relationship; hence, the plurality of peak values of the data determination process 80 may also directly correspond to the peak values of the current signal I1.

According to the data determination process 80, the control unit 108 first calculates the frequency of the current signal I1 to determine the total number of a plurality of peak values during a sub-data cycle (Step 802). According to the data transmission standard of the induction type power supply system, transmission frequency of a data bit is substantially equal to 2 kHz; hence, the length of each data bit is substantially equal to 0.5 ms, and the length of each sub-data cycle is substantially equal to 0.25 ms. If the frequency of the current signal I1 is equal to 200 kHz, each sub-data cycle may include 50 peak values. Then, signals in the positive half cycle of the current signal I1 may be retrieved and amplified to be converted into the amplified signal S2. In a sub-data cycle, the control unit 108 may detect the number of peak values greater than the reference voltage Vref_2 among the plurality of peak values of the amplified signal S2 (i.e. the number of trigger signals of the comparison result R1), in order to calculate a trigger ratio of the plurality of peak values greater than the reference voltage Vref_2 according to the total number of the plurality of peak values (Step 804). For example, there may be 50 peak values in each sub-data cycle. If 45 among the 50 peak values are greater than the reference voltage Vref_2 to trigger the comparison result R1 to output a trigger signal, the trigger ratio will be 90%. The control unit 108 then outputs a sub-data bit corresponding to the sub-data cycle according to the trigger ratio.

Figure 9:
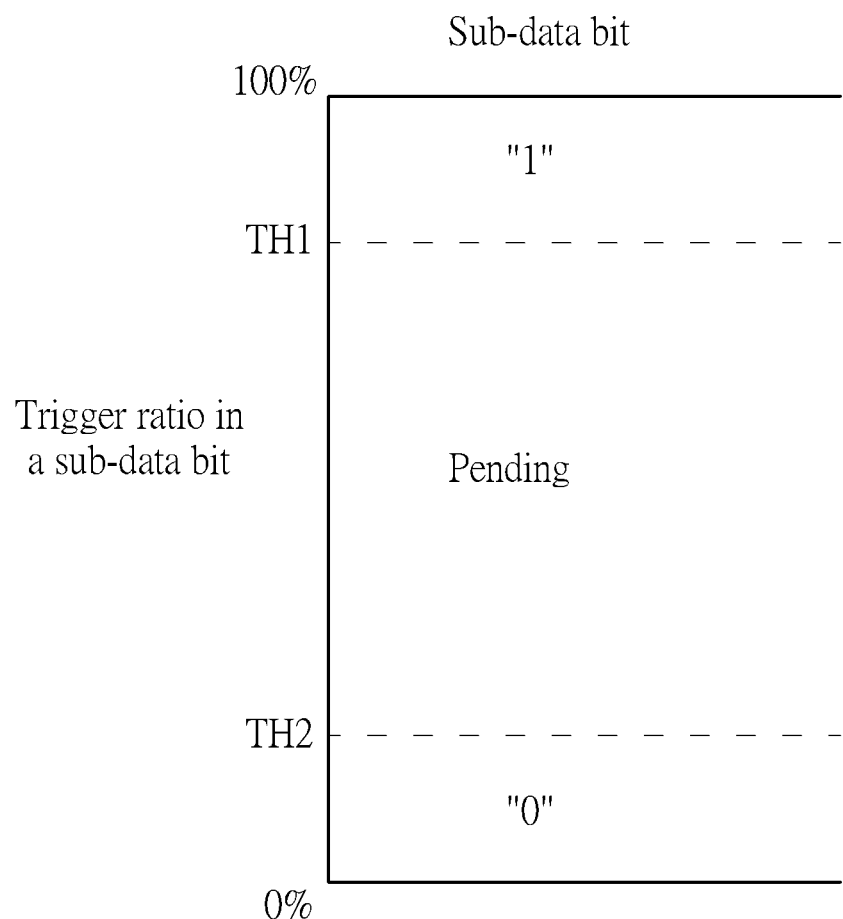
FIG. 9 is a schematic diagram of the sub-data bit determined via the trigger ratio according to an embodiment of the present invention.

In detail, the 50 peak values corresponding to each sub-data bit all have the same output value if the signal determination is not influenced by any noises. If the comparison result R1 corresponding to the entire 50 peak values output trigger signals, the value of the sub-data bit should be logic "1". If the comparison result R1 corresponding to the entire 50 peak values output non-trigger signals, the value of the sub-data bit should be logic "0". However, the comparison result R1 may be interfered by noises in the signal transmission path, such that parts of the comparison result R1 may output erroneous values. In such a situation, the present invention may determine the value of the sub-data bit via the trigger ratio. Please refer to FIG. 9, which is a schematic diagram of the sub-data bit determined via the trigger ratio according to an embodiment of the present invention. As shown in FIG. 9, the control unit 108 may set threshold values TH1 and TH2 for determination of the trigger ratio, wherein the threshold value TH1 is greater than the threshold value TH2. When the trigger ratio is greater than the threshold value TH1, the sub-data bit may be outputted as logic "1"; and when the trigger ratio is smaller than the threshold value TH2, the sub-data bit may be outputted as logic "0". In addition, when the trigger ratio is located between the threshold value TH1 and the threshold value TH2, the control unit 108 may not determine the logic value of the corresponding sub-data bit; hence, the sub-data bit may be set to be pending (Step 806). For example, the threshold value TH1 may be set to 80% and the threshold value TH2 may be set to 20%. Assuming that each sub-data bit corresponds to 50 peak values, the sub-data bit may be logic "1" if more than 40 among the 50 peak values output trigger signals in the comparison result R1. The sub-data bit may be logic "0" if less than 10 among the 50 peak values output trigger signals in the comparison result R1. If the number of peak values outputting trigger signals in the comparison result R1 is between 10 and 40 among the 50 peak values, the sub-data bit may be pending, in order to generate a plurality of pending received data sequences. In such a situation, the pending received data sequences may still be utilized to obtain the accurate modulation data via subsequent determination mechanisms.

The control unit 108 in turn receives each of the plurality of sub-data bits in the modulation data, and determines the logic value of each sub-data bit according to the threshold value TH1 and the threshold value TH2, wherein the determination of the plurality of sub-data bits may form a received data sequence (Step 808). If there is no pending sub-data bit within the plurality of sub-data bits, all sub-data bits may be accurately determined. Therefore, after the determination of all sub-data bits in the modulation data is accomplished, these sub-data bits may form a received data sequence (Step 820), such as the sub-data sequence "1100101011" shown in FIG. 3. However, if a pending sub-data bit exists in a section of data, the pending sub-data bit may be set to different logic values, respectively, to generate multiple pending received data sequences after all sub-data bits in the modulation data are determined (Step 810). Assuming that there is only one pending sub-data bit within a section of data, there may be two pending received data sequences corresponding to this section of data, wherein the value of the pending sub-data bit is logic "1" in one pending received data sequence, and the value of the pending sub-data bit is logic "0" in the other pending received data sequence. In addition, if there are two pending sub-data bits in a section of data, there may be four pending received data sequences corresponding to this section of data, wherein the four pending received data sequences correspond to four different output results of the two pending sub-data bits, respectively.

Please note that the sub-data bits are generated by the receiving-end module via NRZ encoding, so the sub-data bits may comply with the transition characteristics of the NRZ line code. As shown in FIG. 4, signal transition may occur every clock cycles according to the NRZ line code; hence, a transition may occur right after two consecutive sub-data cycles having no transition. In other words, there may not be any three consecutive sub-data cycles without transition; that is, there may not be three consecutive sub-data bits of which all have values equal to logic "1" or three consecutive sub-data bits of which all have values equal to logic "0". Therefore, when there are three consecutive sub-data bits having the same values in the process of receiving the sub-data bits, the control unit 108 may set these three sub-data bits to be pending, or set several sub-data bits which may easily be erroneous among these three sub-data bits to be pending, in order to perform subsequent determination.

The control unit 108 then decodes each sub-data bit in the plurality of pending received data sequences, in order to generate the plurality of modulation data sequences, wherein each pending received data sequence may be decoded to one of the modulation data sequences (Step 812). The decoding process may apply the decoding scheme of the NRZ line code, as shown in FIG. 4 and FIG. 5. For example, after the initialization process 60 is accomplished, the supplying-end module 10 may still keep receiving the pre-launch signal (i.e. "010101 . . ."), and then receive two consecutive logic "0", which indicates the start bit START shown in FIG. 4. The control unit 108 then divides every two sub-data bits into a group from the start bit START, and decodes every two sub-data bits to a modulation data bit according to signal transition, in order to generate the modulation data sequence.

For different series of received sub-data bits, the numbers of pending sub-data bits are different, and the numbers of pending received data sequences are thereby different. As mentioned above, if there is no pending sub-data bit in a series of sub-data bits, all sub-data bits may be accurately determined, so there may be only one received data sequence generated. In such a situation, the received data sequence may be decoded to a modulation data sequence, and the modulation data sequence may be determined to be the modulation data. The control unit 108 then outputs the modulation data sequence as an accurate decoding result of the modulation data (Step 822). If a series of sub-data bits include pending sub-data bit (s), multiple pending received data sequences may be generated. In such a situation, these pending received data sequences may be decoded to modulation data sequences, respectively, and only one of these modulation data sequences may be the accurate modulation data. The control unit 108 may in turn determine the accuracy of these modulation data sequences according to the error checking code in the modulation data, in order to determine the value (s) of the pending sub-data bit (s) (Step 814). If a modulation data sequence passes the checking of the error checking code and is determined to be accurate, the control unit 108 may select this modulation data sequence as the accurate decoding result of the modulation data (Step 818). If a modulation data sequence is determined to be inaccurate, the control unit then determines the next modulation data sequence. If all of the modulation data sequences are determined to be inaccurate, the control unit 108 may discard all of the modulation data sequences (Step 816).

As shown in FIG. 4, the NRZ line code includes one parity checking code PARITY, and can thereby process a single pending sub-data bit. In some embodiments, if there are multiple pending sub-data bits, a more complex error checking code should be applied. By using the above method, when a data bit cannot be determined, it is first set to be pending, and corrected to an accurate data bit via the error checking code. In comparison with the conventional decoding method having error finding capability only (without error correction capability), the decoding method of the present invention may set the data bit (s) which may be erroneous to be pending and correct the data bit(s) according to the error checking code.

Please note that, in other embodiments, if another encoding scheme is applied in the receiving end, the control unit 108 may also apply a corresponding decoding scheme for the decoding operations, which should not be limited to the NRZ line code described in the abovementioned embodiments.

Since the data transmission of the induction type power supply system is always accompanied by power transmission, the data is easily interfered by the load of the induction type power supply system. As mentioned above, the current signal I1 has smaller variations in light load or no load, and the variations on the current signal I1 may increase with the increasing load. In such a situation, the reference voltages Vref_1 and Vref_2 should be adjusted based on the magnitude of the current signal I1, in order to prevent the data from failed determination.

Figure 10:
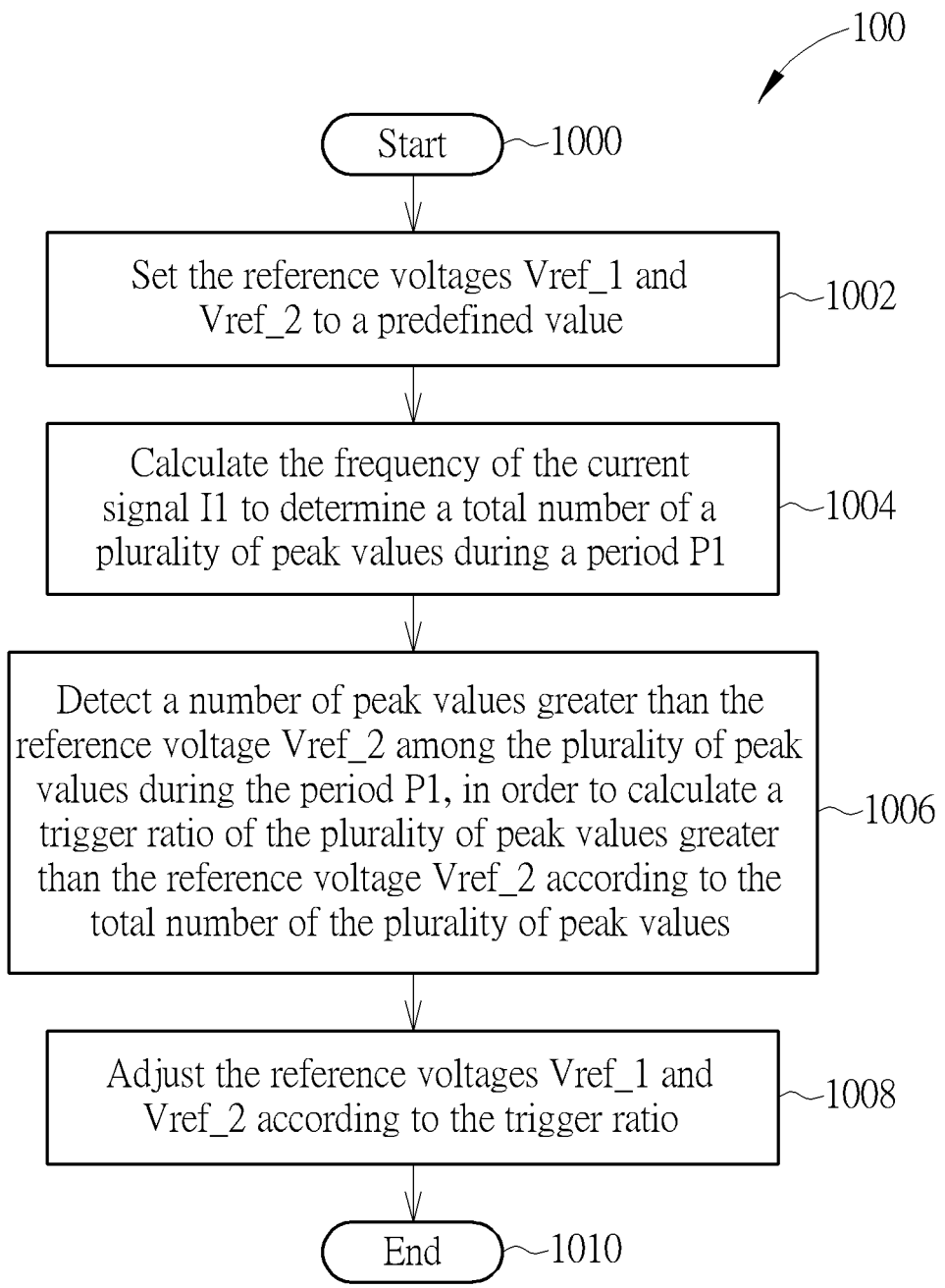
FIG. 10 is a schematic diagram of a reference voltage adjustment process according to an embodiment of the present invention.

Please refer to FIG. 10, which is a schematic diagram of a reference voltage adjustment process 100 according to an embodiment of the present invention. As shown in FIG. 10, the reference voltage adjustment process 100 may be compiled into the program 134, to be realized in the voltage setting unit 104. The reference voltage adjustment process 100 includes the following steps:

Step 1000: Start.

Step 1002: Set the reference voltages Vref_1 and Vref_2 to a predefined value.

Step 1004: Calculate the frequency of the current signal I1 to determine a total number of a plurality of peak values during a period P1.

Step 1006: Detect a number of peak values greater than the reference voltage Vref_2 among the plurality of peak values during the period P1, in order to calculate a trigger ratio of the plurality of peak values greater than the reference voltage Vref_2 according to the total number of the plurality of peak values.

Step 1008: Adjust the reference voltages Vref_1 and Vref_2 according to the trigger ratio.

Step 1010: End.

Since the plurality of peak values of the reference voltage adjustment process 100 are compared with the reference voltage Vref_2, these peak values may be regarded as peak heights of the amplified signal S2 according to the structure of the supplying-end module 10. In addition, the peak values of the amplified signal S2 may correspond to the peak values of the current signal I1 with a positive relationship; hence, the plurality of peak values of the reference voltage adjustment process 100 may also directly correspond to the peak values of the current signal I1.

According to the reference voltage adjustment process 100, the voltage setting unit 104 may adjust the reference voltages Vref_1 and Vref_2 according to peak values of the amplified signal S2. First of all, the voltage setting unit 104 sets the reference voltages Vref_1 and Vref_2 to a predefined value, respectively (Step 1002). The voltage setting unit 104 then calculates the frequency of the current signal I1 to determine the total number of the plurality of peak values during the period P1 (Step 1004), and detects the number of peak values greater than the reference voltage Vref_2 among the plurality of peak values during the period P1, in order to calculate the trigger ratio of the plurality of peak values greater than the reference voltage Vref_2 according to the total number of the plurality of peak values (Step 1006). According to the data transmission standard of the induction type power supply system, the modulation data is encoded via the NRZ line code to generate the sub-data bits. Therefore, at least one transition may occur in every two sub-data cycles. In other words, the situation where signal transition does not occur in three consecutive sub-data cycles may not occur; that is, there may not be three consecutive sub-data bits all having the value of logic "1" or three consecutive sub-data bits all having the value of logic "0". As a result, during a period across at least three sub-data cycles, the trigger ratio should be within a specific range. For example, during the period P1 equal to four sub-data cycles, the corresponding four sub-data bits may not be four logic "1" or four logic "0" if these sub-data bits are not influenced by noises. In other words, among these four sub-data bits, there are at most three sections of trigger signals or at most three sections of non-trigger signals. Therefore, during the period P1, the trigger ratio may have an upper limit 75% and a lower limit 25%. In addition, the period P1 may also be set to be equal to three sub-data cycles, five sub-data cycles or other lengths. As long as the period P1 is not shorter than three sub-data cycles, the trigger ratio 100% or 0% should not occur.

Figure 11:
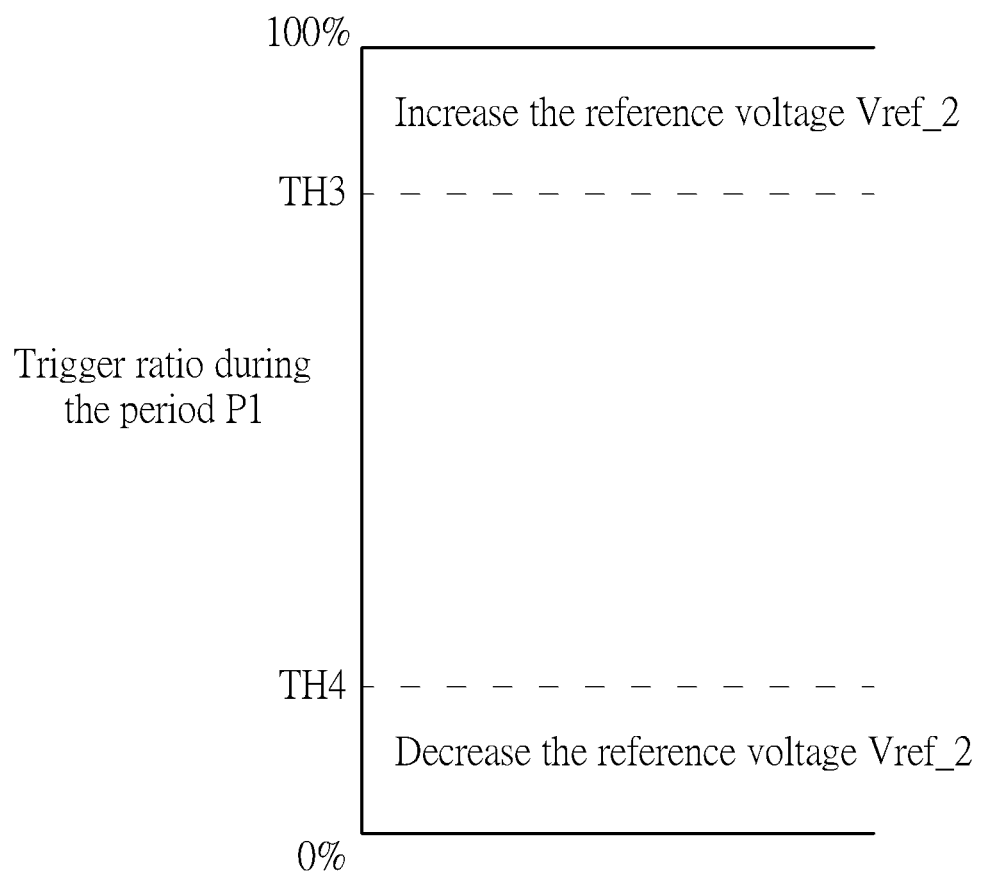
FIG. 11 is a schematic diagram of adjustment of the reference voltage based on the trigger ratio according to an embodiment of the present invention.

The voltage setting unit 104 then adjusts the reference voltages Vref_1 and Vref_2 according to the trigger ratio (Step 1008). Please refer to FIG. 11, which is a schematic diagram of adjustment of the reference voltage based on the trigger ratio according to an embodiment of the present invention. As shown in FIG. 11, the control unit 108 may set threshold values TH3 and TH4 for determination of the trigger ratio, wherein the threshold value TH3 is greater than the threshold value TH4. When the trigger ratio is greater than the threshold value TH3, the control unit 108 may determine that the trigger ratio of the plurality of peak values greater than the reference voltage Vref_2 during the period P1 is too high, and the voltage setting unit 104 accordingly increases the reference voltage Vref_2 to decrease the trigger ratio to a normal range. When the trigger ratio is smaller than the threshold value TH4, the control unit 108 may determine that the trigger ratio of the plurality of peak values greater than the reference voltage Vref_2 during the period P1 is too low, and the voltage setting unit 104 accordingly decreases the reference voltage Vref_2 to increase the trigger ratio to a normal range. When the trigger ratio is between the threshold value TH3 and the threshold value TH4, the reference voltage Vref_2 does not need to be adjusted. For example, if the length of the period P1 is equal to four sub-data cycles, the upper limit and lower limit of the trigger ratio should be 75% and 25%, respectively. In consideration of noise interferences, the threshold value TH3 may be set to 80% and the threshold value TH4 may be set to 20%, in order to increase the reference voltage Vref_2 to decrease the trigger ratio when the trigger ratio is greater than 80%, and decrease the reference voltage Vref_2 to increase the trigger ratio when the trigger ratio is less than 20%. Please note that the trigger ratio shown in FIG. 11 is the ratio of trigger signals during the period P1 (equal to at least three sub-data cycles), which is different from the trigger ratio in a single sub-data cycle as shown in FIG. 9.

Figure 12:
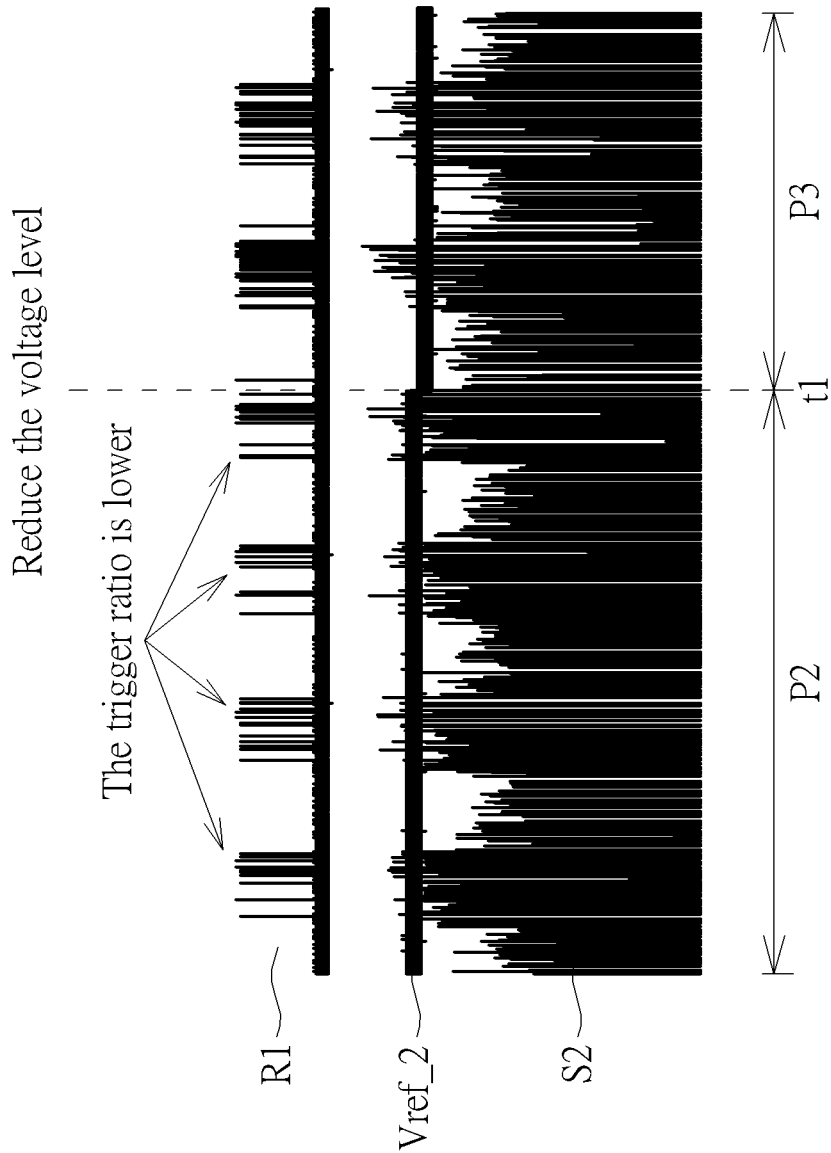
FIG. 12 is a schematic diagram of adjustment of the reference voltage based on the trigger ratio according to an embodiment of the present invention.

Please refer to FIG. 12, which is a schematic diagram of adjustment of the reference voltage Vref_2 based on the trigger ratio according to an embodiment of the present invention. As shown in FIG. 12, the average peak value of the amplified signal S2 is lower in the period P2, so signal quality of the trigger signals in the comparison result R1 is worse. The control unit 108 detects that the trigger ratio of the peak values of the amplified signal S2 greater than the reference voltage Vref_2 during a period is lower than usual, and thereby reduces the voltage level of the reference voltage Vref_2 (e.g. the time point t1). After the reference voltage Vref_2 is reduced, the signal quality may return to normal, so that the trigger ratio of trigger signals in the comparison result R1 may increase (e.g. the period P3), which allows the sub-data bits to be outputted accurately.

In detail, when the load increases during a period of data transmission, the amplitude of the current signal I1 may increase, and the peak values of the amplified signal S2 may also increase; hence, the trigger ratio may be higher than the threshold value TH3. In such a situation, the voltage setting unit 104 may control the reference voltage Vref_2 to rise with the increasing peak values of the amplified signal S2, in order to let the trigger ratio to return to the normal range. On the other hand, when the load decreases, the amplitude of the current signal I1 may decrease, and the peak values of the amplified signal S2 may also decrease; hence, the trigger ratio may be lower than the threshold value TH4. In such a situation, the voltage setting unit 104 may control the reference voltage Vref_2 to fall with the decreasing peak values of the amplified signal S2, in order to let the trigger ratio to return to the normal range.

Figure 13:
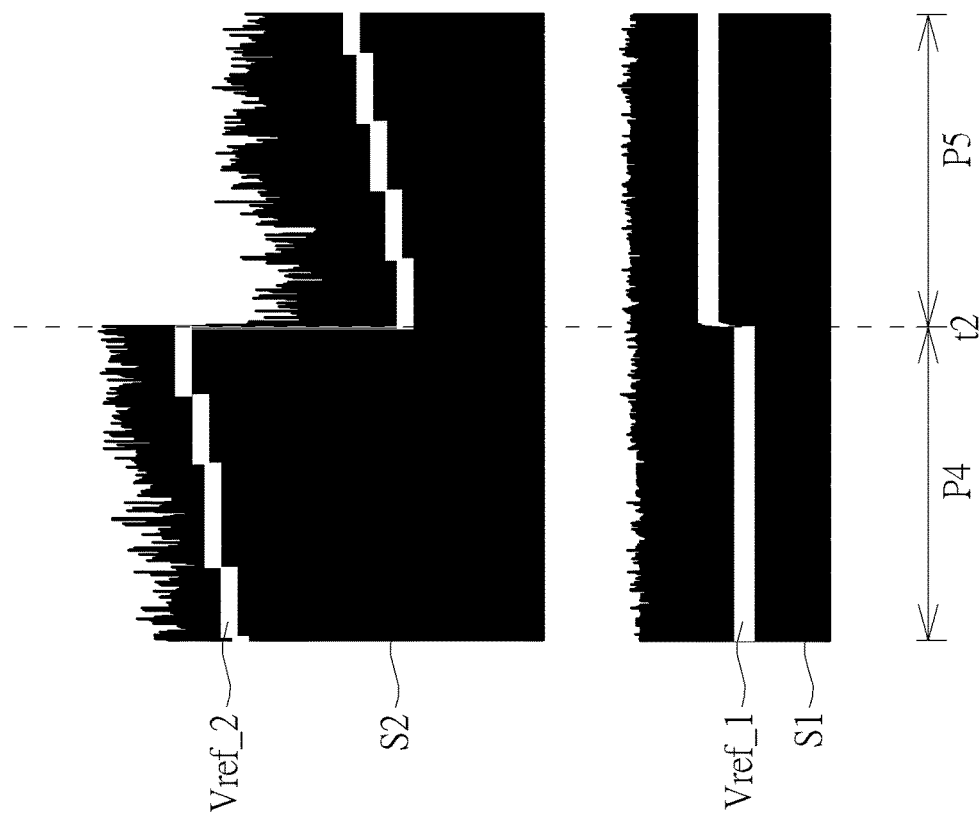
FIG. 13 is a schematic diagram of adjustment of the reference voltages based on the magnitude of the current signal according to an embodiment of the present invention.

In the supplying-end module 10, the current signal I1 is converted into the half-cycle signal S1, and then the peaks of the current signal I1 are amplified by the reference voltage Vref_1. Therefore, in addition to the adjustment of the reference voltage Vref_2, the voltage setting unit 104 may also adjust the reference voltage Vref_1 when load variations occur, in order to vary the amplification degree of the amplifier A2. Please refer to FIG. 13, which is a schematic diagram of adjustment of the reference voltages Vref_1 and Vref_2 based on the magnitude of the current signal I1 according to an embodiment of the present invention. FIG. 13 illustrates waveforms of the reference voltages Vref_1 and Vref_2, the half-cycle signal S1 and the amplified signal S2. According to the reference voltage adjustment process 100, both of the reference voltages Vref_1 and Vref_2 may be adjusted according to variations of the current signal I1. During the period P4, both of the half-cycle signal S1 and the amplified signal S2 rise with the increasing load. Since the amplified signal S2 undergoes two stages of amplifications, it has a more evident rising. Meanwhile, the reference voltage Vref_2 also rises with the increasing amplified signal S2. At the time point t2, the reference voltage Vref_2 has risen to its highest voltage level, so the voltage setting unit 104 further increases the reference voltage Vref_1, in order to decrease the amplification ratio of the amplifier A2, i.e. decrease the retrieved parts of the peak values. At this moment, the amplified signal S2 may fall instantly and significantly, and the reference voltage Vref_2 may also fall to a lower voltage level to keep track to the amplified signal S2 (e.g. the period P5). In such a situation, the adjustment of the reference voltage Vref_2 may be regarded as fine tune, and the adjustment of the reference voltage Vref_1 may be regarded as coarse tune. In other embodiments, if more stages of amplifiers are applied in the supplying-end module 10 to amplify the current signal I1 and more reference voltages are thereby required, every reference voltage may be adjusted according to system requirements, which is not limited herein.

In addition, the reference voltage Vref_2 is adjusted with a fixed unit of voltage in the above embodiment, but in other embodiments, the adjustment scale of the reference voltages may also vary according to system requirements. For example, if the trigger ratio is between 5% and 20%, the voltage setting unit 104 may decrease the reference voltage Vref_2 by one unit of voltage in each period P1. If the trigger ratio is smaller than 5% or close to 0%, the voltage setting unit 104 may decrease the reference voltage Vref_2 by two or three units of voltage at a time in order to accelerate the adjustment speed.

According to the above voltage adjustment method, the supplying-end module of the present invention may adjust the reference voltage when the load of the receiving end varies, and the reference voltage can thereby keep track to the amplification signal or the current signal, in order to perform subsequent determination of the modulation data.

Please note that the data determination method of the present invention may retrieve the modulation data of the receiving-end module by detecting variations on the coil. Those skilled in the art can make modifications and alternations accordingly. For example, the implementation of the amplifiers A1, A2 and the comparator 106 in the supplying-end module 10 is only one of various implementations for amplifying the current signal I1 and retrieving its peak value variations. In other embodiments, other supplying-end modules may include different numbers of amplifiers, or other circuit structures may be applied to realize the data determination method of the present invention, which is not limited herein. In addition, the voltage setting unit 104 shown in FIG. 1 is implemented in the supplying-end module 10 alone for generating the reference voltages Vref_1 and Vref_2, but in other embodiments, the voltage setting unit 104 may also be integrated into the control unit 108, so the processors 120 and 130 may be integrated into a single processor and the storage units 122 and 132 may be integrated into a single storage unit. Furthermore, the voltage generators L1 and L2 of the voltage setting unit 104 may also be implemented in the supplying-end module 10 alone.

As for data processing, the present data modulation/demodulation method applies the widely utilized wireless charging standard Qi in the induction type power supply system; hence, the data format is UART and the encoding method is the NRZ line code. In other embodiments, if data transmission is performed via other encoding schemes or other data formats, the present invention may also adapt to other data encoding methods or data formats. For example, the abovementioned methods for determining sub-data bits according to the trigger ratios in the sub-data cycles may also be applied to determine the real data bits encoded by several encoding schemes. In addition, the initialization process of the present invention is determined according to the format of the pre-launch signal. If another pre-launch signal with another format is applied, the initialization process should also be adjusted accordingly, in order to obtain the cycle and time points for data determination.

In the prior art, the method of analyzing signals and determining data in the supplying end is filtering the voltage signals on the coil via a low-pass filter first, and retrieving low frequency signals and then performing demodulation. This method may be limited to a specific frequency without flexibility and may easily be influenced by noises. In addition, variations of the voltage signals on the common coil may decrease with the increasing load, and the signal determination capability is thereby reduced, which may result in failed demodulation. In comparison, the data determination method and the supplying-end module of the present invention can not only be adapted to the data transmission format of the induction type power supply system, but also provide a better data determination and decoding method. In a sub-data bit of the current signal, multiple peak values are determined to eliminate noise interferences. The pending bit is also utilized for data decoding and recovery when there are sub-data bits difficult to be determined. When the varied load causes signal amplitudes to vary, the present invention may further adjust the amplification ratio by adjusting the reference voltage, so that the induction type power supply system may perform data decoding under different load conditions. By the above methods, the induction type power supply system can therefore perform data determination effectively.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data determination method for a supplying-end module of an induction type power supply system, the method comprising:
   generating a current signal on a resonant coil of the supplying-end module according to a modulated signal of a receiving-end module of the induction type power supply system fed back from a resonant coil of the receiving-end module to the resonant coil of the supplying-end module;
   amplifying the current signal to retrieve a plurality of peak values of the current signal in a time domain;
   setting a reference voltage according to magnitudes of the plurality of peak values;
   comparing the plurality of peak values with the reference voltage to generate a comparison result; and
   analyzing the comparison result to obtain modulation data of the receiving-end module of the induction type power supply system;
   wherein the step of setting the reference voltage according to the magnitudes of the plurality of peak values comprises:
      setting the reference voltage to a predefined value;
      calculating a frequency of the current signal to determine a total number of the plurality of peak values during a first period;
      detecting a number of peak values greater than the reference voltage among the plurality of peak values during the first period, in order to calculate a first trigger ratio of the plurality of peak values greater than the reference voltage according to the total number of the plurality of peak values; and
      adjusting the reference voltage according to the first trigger ratio.

2. The data determination method of claim 1, wherein the current signal corresponds to a current flowing through the resonant coil of the supplying-end module.

3. The data determination method of claim 1, further comprising:
   not performing filtering on the current signal.

4. The data determination method of claim 1, wherein the plurality of peak values of the current signal are located in positive half cycles of the current signal.

5. The data determination method of claim 1, wherein the modulation data of the receiving-end module of the induction type power supply system is transmitted via a data format of a universal asynchronous receiver transmitter (UART), and a length of the first period is not smaller than three sub-data cycles, wherein each of the sub-data cycles is a cycle of signal transition in a non-return-to-zero (NRZ) line code.

6. The data determination method of claim 1, wherein the step of adjusting the reference voltage according to the first trigger ratio comprises:
   increasing the reference voltage when the first trigger ratio is greater than a first threshold value; or
   decreasing the reference voltage when the first trigger ratio is smaller than a second threshold value.

7. A supplying-end module for an induction type power supply system comprising:
   a current sensing element, for generating a current signal on a resonant coil of the supplying-end module according to a modulated signal of a receiving-end module of the induction type power supply system fed back from a resonant coil of the receiving-end module to the resonant coil of the supplying-end module;
   at least one amplifier, for amplifying the current signal to retrieve a plurality of peak values of the current signal in a time domain;
   a voltage setting unit, for setting a reference voltage according to magnitudes of the plurality of peak values;
   a comparator, for comparing the plurality of peak values with the reference voltage to generate a comparison result; and
   a control unit, for analyzing the comparison result to obtain modulation data of the receiving-end module of the induction type power supply system;
   wherein the voltage setting unit comprises:
      a first processor; and
      a first storage unit, electrically connected to the first processor, for storing a first program which instructs the first processor to perform the following steps:
         setting the reference voltage to a predefined value;
         calculating a frequency of the current signal to determine a total number of the plurality of peak values during a first period;
         detecting a number of peak values greater than the reference voltage among the plurality of peak values during the first period, in order to calculate a first trigger ratio of the plurality of peak values greater than the reference voltage according to the total number of the plurality of peak values; and
         adjusting the reference voltage according to the first trigger ratio.

8. The supplying-end module of claim 7, wherein the current signal corresponds to a current flowing through the resonant coil of the supplying-end module.

9. The supplying-end module of claim 7, wherein the at least one amplifier comprises:
   a first amplifier, for retrieving a positive half-cycle part of the current signal and performing a first stage amplification on the positive half-cycle part; and
   a second amplifier, electrically connected to the first amplifier, for performing a second stage amplification on the plurality of peak values located in the positive half-cycle part according to a first reference voltage;
   wherein the comparator compares the plurality of peak values after being amplified by the second stage amplification with a second reference voltage to generate the comparison result.

10. The supplying-end module of claim 9, wherein the voltage setting unit comprises:
    a first voltage generator, electrically connected to the second amplifier, for outputting the first reference voltage; and
    a second voltage generator, electrically connected to the comparator, for outputting the second reference voltage.

11. The supplying-end module of claim 7, wherein modulation data of the receiving-end module of the induction type power supply system is transmitted via a data format of a universal asynchronous receiver transmitter (UART), and a length of the first period is not smaller than three sub-data cycles, wherein each of the sub-data cycles is a cycle of signal transition in a non-return-to-zero (NRZ) line code.

12. The supplying-end module of claim 7, wherein the first program further instructs the first processor to perform the following steps to adjust the reference voltage according to the first trigger ratio:
   increasing the reference voltage when the first trigger ratio is greater than a first threshold value; or
   decreasing the reference voltage when the first trigger ratio is smaller than a second threshold value.

13. A data determination method for a supplying-end module of an induction type power supply system, the method comprising:
   generating a current signal on a resonant coil of the supplying-end module according to a modulated signal of a receiving-end module of the induction type power supply system fed back from a resonant coil of the receiving-end module to the resonant coil of the supplying-end module;
   amplifying the current signal to retrieve a plurality of peak values of the current signal in a time domain;
   setting a reference voltage according to magnitudes of the plurality of peak values;
   comparing the plurality of peak values with the reference voltage to generate a comparison result; and
   analyzing the comparison result to obtain modulation data of the receiving-end module of the induction type power supply system;
   wherein the step of comparing the plurality of peak values with the reference voltage to generate the comparison result comprises:
      calculating a frequency of the current signal to determine a total number of the plurality of peak values during a second period;
      detecting a number of peak values greater than the reference voltage among the plurality of peak values during the second period, in order to calculate a second trigger ratio of the plurality of peak values greater than the reference voltage according to the total number of the plurality of peak values; and
      outputting a sub-data bit corresponding to the second period according to the second trigger ratio.

14. The data determination method of claim 13, wherein the modulation data of the receiving-end module of the induction type power supply system is transmitted via a data format of a UART, and a length of the second period is equal or close to a sub-data cycle, wherein the sub-data cycle is a cycle of signal transition in a NRZ line code.

15. The data determination method of claim 13, wherein the step of outputting the sub-data bit corresponding to the second period according to the second trigger ratio comprises:
   outputting the sub-data bit as logic "1" when the second trigger ratio is greater than a third threshold value; or
   outputting the sub-data bit as logic "0" when the second trigger ratio is smaller than a fourth threshold value;
   wherein the third threshold value is greater than or equal to the fourth threshold value.

16. The data determination method of claim 15, wherein the step of outputting the sub-data bit corresponding to the second period according to the second trigger ratio further comprises:
setting the sub-data bit to be pending when the second trigger ratio is located between the third threshold value and the fourth threshold value.

17. The data determination method of claim 16, further comprising:
   setting at least one sub-data bit among three sub-data bits corresponding to three consecutive second periods to be pending when the three sub-data bits have the same value.

18. The data determination method of claim 17, further comprising:
   in turn, determining a logic value of each of a plurality of sub-data bits in the modulation data, in order to generate a received data sequence comprising the plurality of sub-data bits.

19. The data determination method of claim 18, wherein the step of analyzing the comparison result to obtain the modulation data of the receiving-end module of the induction type power supply system comprises:
   when there is at least one pending sub-data bit among the plurality of sub-data bits, respectively inputting different logic values to the at least one pending sub-data bit, in order to generate a plurality of pending received data sequences after all of the plurality of sub-data bits in the modulation data are determined;
   decoding the plurality of sub-data bits in each of the plurality of pending received data sequences to generate a plurality of modulation data sequences, respectively; and
   in turn, determining an accuracy of each of the plurality of modulation data sequences according to an error checking code in the modulation data.

20. The data determination method of claim 19, wherein the step of in turn determining the accuracy of each of the plurality of modulation data sequences according to the error checking code in the modulation data comprises:
   when a modulation data sequence among the plurality of modulation data sequences is determined to be accurate, outputting the modulation data sequence as an accurate decoding result of the modulation data;
   when a modulation data sequence among the plurality of modulation data sequences is determined to be inaccurate, determining a next modulation data sequence among the plurality of modulation data sequences; and
   when all of the plurality of modulation data sequences are determined to be inaccurate, discarding the plurality of modulation data sequences.

21. A data determination method for a supplying-end module of an induction type power supply system, the method comprising:
   generating a current signal on a resonant coil of the supplying-end module according to a modulated signal of a receiving-end module of the induction type power supply system fed back from a resonant coil of the receiving-end module to the resonant coil of the supplying-end module;
   amplifying the current signal to retrieve a plurality of peak values of the current signal in a time domain;
   setting a reference voltage according to magnitudes of the plurality of peak values;
   comparing the plurality of peak values with the reference voltage to generate a comparison result;
   analyzing the comparison result to obtain modulation data of the receiving-end module of the induction type power supply system; and performing an initialization process for obtaining the modulation data according to a characteristic of the plurality of peak values;

wherein the step of performing the initialization process for obtaining the modulation data according to the characteristic of the plurality of peak values comprises:

determining whether the plurality of peak values comply with a format of a pre-launch signal of a UART.

22. A data determination method for a supplying-end module of an induction type power supply system, the method comprising:

generating a current signal on a resonant coil of the supplying-end module according to a modulated signal of a receiving-end module of the induction type power supply system fed back from a resonant coil of the receiving-end module to the resonant coil of the supplying-end module;

amplifying the current signal to retrieve a plurality of peak values of the current signal in a time domain;

setting a reference voltage according to magnitudes of the plurality of peak values;

comparing the plurality of peak values with the reference voltage to generate a comparison result;

analyzing the comparison result to obtain modulation data of the receiving-end module of the induction type power supply system; and performing an initialization process for obtaining the modulation data according to a characteristic of the plurality of peak values;

wherein the step of performing the initialization process for obtaining the modulation data according to the characteristic of the plurality of peak values further comprises:

detecting whether there is a specific number of consecutive peak values not exceeding the reference voltage;

after the specific number of consecutive peak values not exceeding the reference voltage is detected, determining whether a following peak value exceeds the reference voltage, and starting a first timer when a peak value exceeding the reference voltage occurs;

when the first timer is running, after the specific number of consecutive peak values not exceeding the reference voltage is detected, determining whether a following peak value exceeds the reference voltage, and stopping the first timer when another peak value exceeding the reference voltage occurs;

determining whether a first run time of the first timer is equal or close to a predefined data cycle; and starting a second timer when the first run time of the first timer is equal or close to the predefined data cycle, or stopping the initialization process when the first run time of the first timer is not equal or close to the predefined data cycle.

23. The data determination method of claim 22, wherein the step of performing the initialization process for obtaining the modulation data according to the characteristic of the plurality of peak values further comprises:

performing the following steps when the second timer is running:

re-starting the first timer;

after the specific number of consecutive peak values not exceeding the reference voltage is detected, determining whether a following peak value exceeds the reference voltage, and stopping the first timer when a further peak value exceeding the reference voltage occurs;

determining whether a second run time of the first timer is equal or close to the predefined data cycle;

repeating the above steps when the run time of the first timer is equal or close to the predefined data cycle, or stopping the initialization process when the run time of the first timer is not equal or close to the predefined data cycle; and stopping the second timer, and calculating a run time of the second timer when a number of times of re-starting and stopping the first timer reaches a predetermined number;

diving the run time of the second timer by the predetermined number to obtain a length of a real data cycle; and setting a length of a cycle for determining a data bit to be equal to the length of the real data cycle.

24. The data determination method of claim 23, further comprising:

calculating a real sub-data cycle according to the real data cycle; and in turn, obtaining a plurality of sub-data bits according to the length of the real sub-data cycle with a starting point on a stopping time of the second timer.

25. A supplying-end module for an induction type power supply system comprising:

a current sensing element, for generating a current signal on a resonant coil of the supplying-end module according to a modulated signal of a receiving-end module of the induction type power supply system fed back from a resonant coil of the receiving-end module to the resonant coil of the supplying-end module;

at least one amplifier, for amplifying the current signal to retrieve a plurality of peak values of the current signal in a time domain;

a voltage setting unit, for setting a reference voltage according to magnitudes of the plurality of peak values;

a comparator, for comparing the plurality of peak values with the reference voltage to generate a comparison result; and a control unit, for analyzing the comparison result to obtain modulation data of the receiving-end module of the induction type power supply system, wherein the control unit comprises:

a second processor; and a second storage unit, electrically connected to the second processor, for storing a second program which instructs the second processor to perform the following steps:

calculating a frequency of the current signal to determine a total number of the plurality of peak values during a second period;

detecting a number of peak values greater than the reference voltage among the plurality of peak values during the second period, in order to calculate a second trigger ratio of the plurality of peak values greater than the reference voltage according to the total number of the plurality of peak values; and outputting a sub-data bit corresponding to the second period according to the second trigger ratio.

26. The supplying-end module of claim 25, wherein the modulation data of the receiving-end module of the induction type power supply system is transmitted via a data format of a UART, and a length of the second period is equal or close to a sub-data cycle, wherein the sub-data cycle is a cycle of signal transition in a NRZ line code.

27. The supplying-end module of claim 25, wherein the second program further instructs the second processor to perform the following steps to output the sub-data bit corresponding to the second period according to the second trigger ratio:
outputting the sub-data bit as logic "1" when the second trigger ratio is greater than a third threshold value; or
outputting the sub-data bit as logic "0" when the second trigger ratio is smaller than a fourth threshold value;
wherein the third threshold value is greater than or equal to the fourth threshold value.

28. The supplying-end module of claim 27, wherein the second program further instructs the second processor to perform the following step to output the sub-data bit corresponding to the second period according to the second trigger ratio:
setting the sub-data bit to be pending when the second trigger ratio is located between the third threshold value and the fourth threshold value.

29. The supplying-end module of claim 28, wherein the second program further instructs the second processor to perform the following step:
setting at least one sub-data bit among three sub-data bits corresponding to three consecutive second periods to be pending when the three sub-data bits have the same value.

30. The supplying-end module of claim 29, wherein the second program further instructs the second processor to perform the following step:
in turn, determining a logic value of each of a plurality of sub-data bits in the modulation data, in order to generate a received data sequence comprising the plurality of sub-data bits.

31. The supplying-end module of claim 30, wherein the second program further instructs the second processor to perform the following steps to analyze the comparison result to obtain the modulation data of the receiving-end module of the induction type power supply system:
when there is at least one pending sub-data bit among the plurality of sub-data bits, respectively inputting different logic values to the at least one pending sub-data bit, in order to generate a plurality of pending received data sequences after all of the plurality of sub-data bits in the modulation data are determined;
decoding the plurality of sub-data bits in each of the plurality of pending received data sequences to generate a plurality of modulation data sequences, respectively; and
in turn, determining an accuracy of each of the plurality of modulation data sequences according to an error checking code in the modulation data.

32. The supplying-end module of claim 31, wherein the second program further instructs the second processor to perform the following steps to in turn determine the accuracy of each of the plurality of modulation data sequences according to the error checking code in the modulation data:
when a modulation data sequence among the plurality of modulation data sequences is determined to be accurate, outputting the modulation data sequence as an accurate decoding result of the modulation data;
when a modulation data sequence among the plurality of modulation data sequences is determined to be inaccurate, determining a next modulation data sequence among the plurality of modulation data sequences; and
when all of the plurality of modulation data sequences are determined to be inaccurate, discarding the plurality of modulation data sequences.

33. A supplying-end module for an induction type power supply system comprising:
a current sensing element, for generating a current signal on a resonant coil of the supplying-end module according to a modulated signal of a receiving-end module of the induction type power supply system fed back from a resonant coil of the receiving-end module to the resonant coil of the supplying-end module;
at least one amplifier, for amplifying the current signal to retrieve a plurality of peak values of the current signal in a time domain;
a voltage setting unit, for setting a reference voltage according to magnitudes of the plurality of peak values;
a comparator, for comparing the plurality of peak values with the reference voltage to generate a comparison result; and
a control unit, for analyzing the comparison result to obtain modulation data of the receiving-end module of the induction type power supply system;
wherein the control unit is further utilized for performing an initialization process for obtaining the modulation data according to a characteristic of the plurality of peak values, and
wherein the control unit determines whether the plurality of peak values comply with a format of a pre-launch signal of a UART to perform the initialization process for obtaining the modulation data according to the characteristic of the plurality of peak values.

34. A supplying-end module for an induction type power supply system comprising:
a current sensing element, for generating a current signal on a resonant coil of the supplying-end module according to a modulated signal of a receiving-end module of the induction type power supply system fed back from a resonant coil of the receiving-end module to the resonant coil of the supplying-end module;
at least one amplifier, for amplifying the current signal to retrieve a plurality of peak values of the current signal in a time domain;
a voltage setting unit, for setting a reference voltage according to magnitudes of the plurality of peak values;
a comparator, for comparing the plurality of peak values with the reference voltage to generate a comparison result; and
a control unit, for analyzing the comparison result to obtain modulation data of the receiving-end module of the induction type power supply system;
wherein the control unit is further utilized for performing an initialization process for obtaining the modulation data according to a characteristic of the plurality of peak values, and
wherein the control unit further performs the following steps to perform the initialization process for obtaining the modulation data according to the characteristic of the plurality of peak values:
detecting whether there is a specific number of consecutive peak values not exceeding the reference voltage;
after the specific number of consecutive peak values not exceeding the reference voltage is detected, determining whether a following peak value exceeds the reference voltage, and starting a first timer when a peak value exceeding the reference voltage occurs;
when the first timer is running, after the specific number of consecutive peak values not exceeding the reference voltage is detected, determining whether a following peak value exceeds the reference voltage, and stopping the first timer when another peak value exceeding the reference voltage occurs;

determining whether a first run time of the first timer is equal or close to a predefined data cycle; and starting a second timer when the first run time of the first timer is equal or close to the predefined data cycle, or stopping the initialization process when the first run time of the first timer is not equal or close to the predefined data cycle.

35. The supplying-end module of claim 34, wherein the control unit further performs the following steps to perform the initialization process for obtaining the modulation data according to the characteristic of the plurality of peak values:

performing the following steps when the second timer is running:

re-starting the first timer;

after the specific number of consecutive peak values not exceeding the reference voltage is detected, determining whether a following peak value exceeds the reference voltage, and stopping the first timer when a further peak value exceeding the reference voltage occurs;

determining whether a second run time of the first timer is equal or close to the predefined data cycle;

repeating the above steps when the second run time of the first timer is equal or close to the predefined data cycle, or stopping the initialization process when the second run time of the first timer is not equal or close to the predefined data cycle; and stopping the second timer, and calculating a run time of the second timer when a number of times of re-starting and stopping the first timer reaches a predetermined number;

diving the run time of the second timer by the predetermined number to obtain a length of a real data cycle; and setting a length of a cycle for determining a data bit to be equal to the length of the real data cycle.

36. The supplying-end module of claim 35, wherein the control unit is further utilized for performing the following steps:

calculating a real sub-data cycle according to the real data cycle; and in turn, obtaining a plurality of sub-data bits according to the length of the real sub-data cycle with a starting point on a stopping time of the second timer.

* * * * *